United States Patent [19]
Takida et al.

[11] Patent Number: 5,305,457
[45] Date of Patent: Apr. 19, 1994

[54] SYSTEM FOR INITIAL PROGRAM LOADING RESPONDING TO NOTIFICATION FROM PROGRAM SUPPLY APPARATUS

[75] Inventors: Masatoshi Takida, Inagi; Satoru Kuwata, Kawasaki; Atsushi Yoshioka, Yokohama; Yasuo Ogasawara, Zama, all of Japan

[73] Assignee: Fujitsu Limited, Kawasaki, Japan

[21] Appl. No.: 97,915

[22] Filed: Jul. 28, 1993

Related U.S. Application Data

[63] Continuation of Ser. No. 658,394, Feb. 20, 1991, abandoned.

[30] Foreign Application Priority Data

Feb. 20, 1990 [JP] Japan ................................ 2-39035

[51] Int. Cl.⁵ .......................... G06F 3/00; G06F 15/20
[52] U.S. Cl. ................................. 395/700; 364/DIG. 1; 364/240.8; 364/240.9; 364/241.1; 364/280.2
[58] Field of Search ................. 395/700; 364/DIG. 1, 364/280.2, 240.9, 240.8, 241.1

[56] References Cited

U.S. PATENT DOCUMENTS

| | | | |
|---|---|---|---|
| 4,787,028 | 11/1988 | Finfrock et al. | 364/200 |
| 4,888,684 | 12/1989 | Lilja et al. | 364/200 |
| 5,109,484 | 4/1992 | Hughes et al. | 395/200 |

Primary Examiner—Gareth D. Shaw
Assistant Examiner—A. Katbab
Attorney, Agent, or Firm—Staas & Halsey

[57] ABSTRACT

An initial program loading system in an information processing system containing a central processing unit and at least one peripheral apparatus connected to the central processing unit. The system transfers program data from the peripheral apparatus to the central processing unit. The system then loads the program data in the central processing unit, responding to an IPL request which is input into said initial program loading system. Each peripheral apparatus has a unit for sending a notification to the central processing unit that the peripheral apparatus is ready to transfer the program data to the central processing unit. After the central processing unit receives the notification, the transfer of the program data is carried out. The IPL request may be received in the central processing unit, or each peripheral apparatus. An IPL controller may be provided in the system. The IPL controller may contain units to receive the IPL request, to receive a notification as above from each peripheral apparatus, to determine one peripheral apparatus from which the program data is to be transferred to the central processing unit, and to notify the result of the determination to the central processing unit.

29 Claims, 27 Drawing Sheets

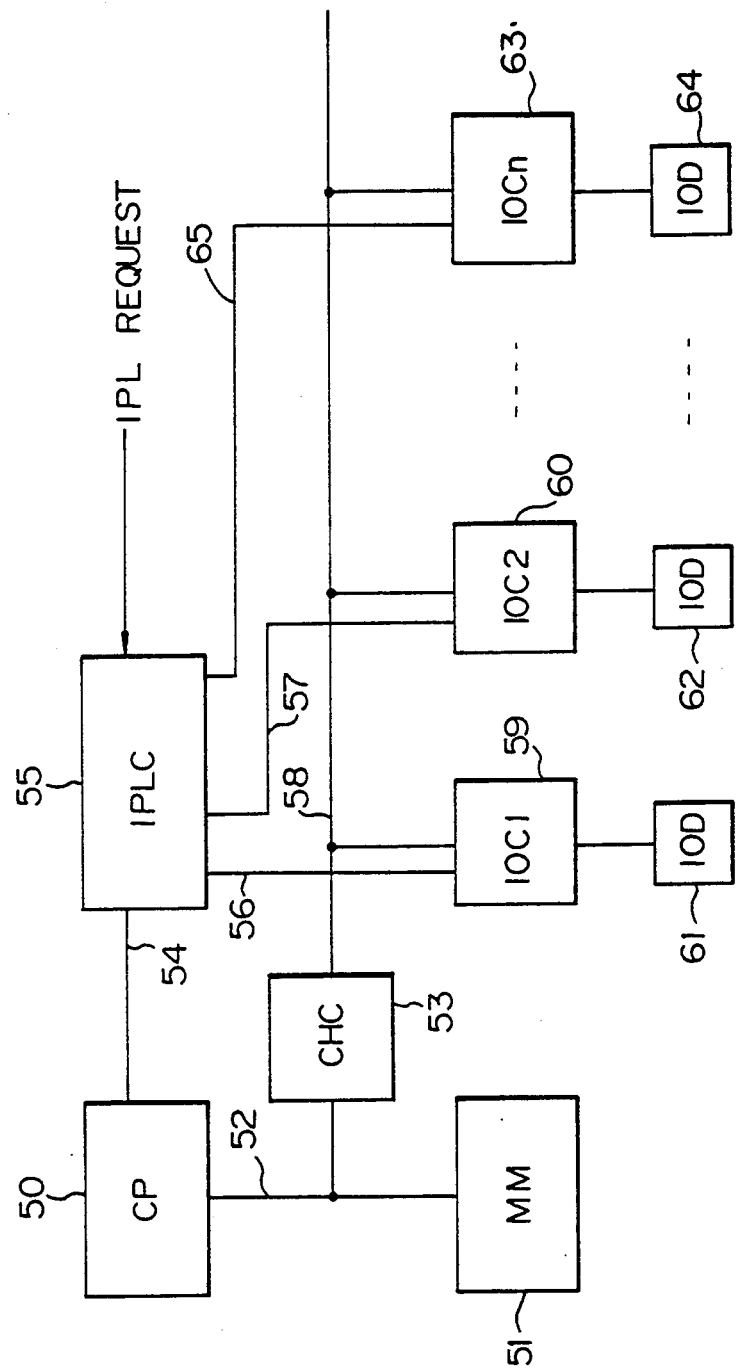

Fig. 29

| 0 | 1 | 2 | 3 | 4 | 5 | 6 | 7 |
|---|---|---|---|---|---|---|---|
| PWR | RMT | OCNS | BCNS | IOC | | | |

Fig. 30

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | IPLR | | | | | | | | | | DER | CMP | TMO | OPC | BUSY |

DSR

SYSTEM FOR INITIAL PROGRAM LOADING RESPONDING TO NOTIFICATION FROM PROGRAM SUPPLY APPARATUS

This application is a continuation of application Ser. No. 07/658,394, field Feb. 20, 1991 now abandoned.

BACKGROUND OF THE INVENTION (1) Field of the Invention

The present invention relates to an initial program loading system in an information processing system containing a central processing unit and peripheral apparatuses connected to the central processing unit. The initial program loading system is provided for transferring program data from one of the peripheral apparatuses to the central processing unit, and loading the program data in the central processing unit.

(2) Description of the Related Art

Distributed information processing systems conventionally include a number of processor units. In many recent distributed information processing systems, each of the processor units has the same hardware construction, but the respective processor units operate differently in accordance with programs which are loaded in the respective processor units. The programs are loaded in respective processor units in different ways before the respective processor units start their operation. That is, generally a number of peripheral apparatuses are connected to each processor unit. A program is transferred to the processor unit from a different one of the peripheral apparatuses which holds program data, and the unit is prepared to transfer the program data to the central processing unit in the processor unit.

FIG. 1 shows a configuration of a plurality of processors in a digital exchange system. The digital exchange system of FIG. 1 is comprised of a management processor 1, a plurality of call processors $2_1, 2_2, 2_3, \ldots$, and a plurality of line processors $3_1, 3_2, 3_3, \ldots$.

The management processor 1 controls the whole operation of the digital exchange system including the plurality of call processors $2_1, 2_2, 2_3, \ldots$, and the plurality of line processors $3_1, 3_2, 3_3, \ldots$. Further, reference numeral 5 denotes a magnetic tape device, 9 denotes an operation console, CCA denotes a channel-to-channel adapter, CSC denotes a common signal controller, and SGC denotes a signal controller.

The channel-to-channel adapter CCA is equipped in the management processor 1 and each of the call processors $2_1, 2_2, 2_3, \ldots$ for interfacing between the management processor 1 and the call processors $2_1, 2_2, 2_3 \ldots$. The common signal controller CSC is equipped in each of the line processors $3_1, 3_2, 3_3, \ldots$ and the signal controller SGC is equipped in each of the line processors $3_1, 3_2, 3_3, \ldots$ for interfacing between the respective line processor $3_1, 3_2, 3_3, \ldots$ and the corresponding call processors $2_1, 2_2, 2_3, \ldots$.

The call processors $2_1, 2_2, 2_3, \ldots$ each control a speech path memory (not shown), the line processors $3_1, 3_2, 3_3, \ldots$ each control a line circuit (not shown), and all the processors cooperate with each other to realize a consistent operation of the digital exchange system. Although each of the management processor 1, the call processors $2_1, 2_2, 2_3, \ldots$, and the line processors $3_1, 3_2, 3_3, \ldots$ respectively realize different functions, all of these processors have the same hardware construction so that total production cost is reduced by enabling mass production. Different respective programs (operating systems) are initially loaded for the processors to realize the above different functions (initial program loading operation, IPL).

The initial program loading operation includes its initial stage of loading a boot program (bootstrap loader) which realizes a function of reading (and loading by itself) a total operating system. To load different operating systems in respective processors, different bootstrap loaders must be loaded in the respective processors. Although the above processors have the same construction, respective processors are generally located in different situations, and are generally connected to a plurality of peripheral apparatuses, e.g., a magnetic disc device, a magnetic tape device, terminal equipment, or the like. The initial program loading operation of the processors in the construction of FIG. 1 can be carried out by transferring program data of bootstrap loaders for the respective processors, for example, from the magnetic tape device 5 which is connected to the management processor 1. Further, generally each processor in the construction of FIG. 1 can connect thereto one or more I/O devices, and the bootstrap loader can be transferred to the processor from one of the I/O devices connected thereto. Namely, each processor has a plurality of suppliers of the bootstrap loader.

FIG. 2 is a schematic diagram of a processor unit which includes one of the above processors (for example, a line processor in the construction of FIG. 1) in the conventional distributed information processing system. In FIG. 2, reference numeral 11 denotes a central processor (CPU), 12 denotes a main memory, 13 denotes a channel controller, 14 denotes a channel-to-channel adapter, 15 denotes a magnetic disc device, 16 denotes a magnetic tape device, 17 denotes a main memory bus, and 18 denotes an input and output (I/O) bus.

The channel controller 13 is located between the main memory bus 17 and the I/O bus 18 for controlling operations of data transfer between the main memory 13 and the peripheral apparatus independently from the CPU 11. The channel-to-channel adapter 14 in the processor unit of FIG. 2 is to be connected to another channel-to-channel adapter in another apparatus to carry out data transfer between the processor unit of FIG. 2 and the other apparatus. Generally, the processor unit of FIG. 2 can receive program data from either of the channel-to-channel adapter 14, the magnetic disc device 15, the magnetic tape device 16, or the peripheral apparatus from which the processor unit should receive program data (bootstrap loader) in the initial program loading operation, which varies depending on various situations of the processor unit. Therefore, it is necessary to instruct the processor unit from which peripheral apparatus the processor unit should receive program data (bootstrap loader) in the initial program loading operation.

Conventionally, each processor unit in a distributed information processing system comprises a unit to receive a manual input for instructing the processor unit from which peripheral apparatus the program data should be received, for example, a DIP switch. When an IPL switch (not shown) is turned ON, an IPL request signal is generated and is input into the central processor 11. The central processor 11 comprises a ROM (not shown), and memorizes a microprogram for the initial program loading operation, in the ROM. Responding to the above IPL request signal, and in accordance with the microprogram, the central processor 11 reads the above input from the DIP switch, and the operation jumps to a vector address in the microprogram which corresponds to that input. In accordance with instructions in the microprogram beginning at the vector address, the central processor 11 carries out an initial program loading operation to receive a bootstrap loader from a peripheral apparatus which is instructed by the above manual input in the DIP switch.

However, according to the above conventional method to input an instruction to select a peripheral apparatus which supplies the bootstrap loader, to each processor unit individually and manually, an error is liable to occur when inputting the manual instruction to each processor unit. Further, when a new processor unit is added to the distributed information processing system, or when modifying processor configuration in the distributed information processing system, the above-mentioned microprogram which is memorized in the ROM in each processor unit, must be renewed or modified. Therefore, the above conventional method heavily reduces the flexibility in modifying a processor configuration in a distributed information processing system.

SUMMARY OF THE INVENTION

An object of the present invention is to provide an initial program loading system for a processor unit in an information processing system in which no manual input to the processor unit is necessary, and no modification of the processor unit is necessary when a new processor unit is added to the information processing system or when modifying a configuration of processor(s) and peripheral apparatuses in the information processing system.

According to the first aspect of the present invention, there is provided an initial program loading system in an information processing system containing a central processing unit and at least one peripheral apparatus connected to the central processing unit, for transferring program data from the peripheral apparatus to the central processing unit, and loading the program data in the central processing unit, responding to an IPL request which is input into the initial program loading system.

The peripheral apparatus in the system includes an IPL request receiving unit, a program transfer ready state notifying unit, and a program data transfer unit. The IPL request receiving unit receives the IPL request. The program transfer ready state notifying unit sends to the central processing unit a notification that the peripheral apparatus holds program data which is to be transferred to the central processing unit, and is ready to transfer the program data to the central processing unit. The program data transfer unit transfers the program data to the central processing unit.

The central processing unit includes a notification receiving unit and a program data receiving unit. The notification receiving unit receives the notification, and the program data receiving unit receives the program data which is transferred from the peripheral apparatus after sending the notification.

According to the second aspect of the present invention, the peripheral apparatus also includes a program transfer ready state determining unit. This unit determines whether or not the peripheral apparatus holds program data which is to be transferred to the central processing unit, and whether the peripheral apparatus is ready to transfer the program data to the central processing unit, when the IPL request is received. The program transfer ready state notifying unit sends to the central processing unit the above notification when so determined by the program transfer ready state determining unit.

According to the third aspect of the present invention, the central processing unit includes an IPL request receiving unit, an IPL ready state determining unit, an IPL apparatus notification receiving unit, and a program data receiving unit. The IPL request receiving unit receives the IPL request. The IPL ready state notifying unit determines whether or not the central processing unit is ready to receive program data which is to be loaded in the central processing unit when the IPL request notification is received, and sends a first notification to at least one of the peripheral apparatuses. The IPL apparatus notification receiving unit receives a second notification from at least one of the peripheral apparatuses. The program data receiving unit receives the program data from the peripheral apparatus after receiving the second notification.

At least one of the peripheral apparatuses includes an IPL ready notification receiving unit, a program transfer ready state determining unit, a program transfer ready state notifying unit, and a program data transfer unit. The IPL ready notification receiving unit receives the above first notification. The program transfer ready state determining unit determines whether or not the peripheral apparatus holds program data which is to be transferred to the central processing unit, and is ready to transfer the program data to the central processing unit, when the first notification is received. The program transfer ready state notifying unit sends to the central processing unit the second notification that the peripheral apparatus holds program data which is to be transferred to the central processing unit, and is ready to transfer the program data to the central processing unit, when so determined in the program transfer ready state determining unit. The program data transfer unit transfers the program data to the central processing unit when it is determined by the program transfer ready state determining unit that the peripheral apparatus holds program data and is ready to transfer the program data to the central processing unit.

According to the fourth aspect of the present invention, an IPL controller is provided in addition to the above central processing unit and peripheral apparatuses. The IPL controller includes an IPL request receiving unit, an IPL request notifying unit, an IPL ready notification receiving unit, an IPL apparatus determining unit, and an IPL apparatus notifying unit.

The IPL request receiving unit receives the IPL request. The IPL request notifying unit sends an IPL request notification notifying reception of the IPL request, to the central processing unit and at least one of the peripheral apparatuses when the IPL request is received in the IPL request receiving unit. The IPL apparatus determining unit receives a transfer ready notification from at least one of the peripheral apparatuses, and determines one peripheral apparatus from which the transfer ready notification is received, as a peripheral apparatus from which the program data is to be transferred to the central processing unit. The transfer ready notification notifies the IPL controller that the peripheral apparatus holds program data and is ready to transfer the program data to the central processing unit. The IPL apparatus notifying unit sends an IPL apparatus notification notifying the central processing unit which peripheral apparatus is determined in the IPL apparatus determining unit.

The central processing unit includes a first IPL request notification receiving unit, an IPL ready state determining unit, an IPL apparatus notification receiving unit, and a program data receiving unit. The first IPL request notification receiving unit receives the IPL request notification. Then, the IPL ready state determining unit determines whether or not the central processing unit is ready to receive program data to be loaded in the central processing unit. The IPL apparatus notification receiving unit receives the IPL apparatus notification. The program data receiving unit receives the program data which is transferred from the peripheral apparatus when the IPL ready determining unit determines that the central processing unit is ready to receive the program data.

At least one of the peripheral apparatuses includes a second IPL request notification receiving unit, a program transfer ready state determining unit, a program transfer ready state notifying unit, and a program data transfer unit. The second IPL request notification receiving unit receives the IPL request notification. Then, the program transfer ready state determining unit determines whether or not that peripheral apparatus (within which the program transfer ready state determining unit is provided) holds program data and is ready to transfer the program data to the central processing unit. The program transfer ready state notifying unit sends to the IPL controller the transfer ready notification that that peripheral apparatus holds program data and is ready to transfer the program data to the central processing unit, when so determined in the program transfer ready state determining unit. The program data transfer unit transfers the program data to the central processing unit after the transfer ready notification is sent by the program transfer ready state notifying unit.

According to the fifth aspect of the present invention, each of the peripheral apparatuses has the same construction as the fourth aspect of the present invention, but the IPL controller and central processing unit are configured differently from those of the fourth aspect. The IPL controller comprises an IPL request receiving unit, an IPL request notifying unit, an IPL apparatus determining unit, and an IPL request and apparatus notifying unit. The IPL request receiving unit receives the IPL request. The IPL request notifying unit sends an IPL request notification notifying reception of the IPL request, to at least one of the peripheral apparatuses when the IPL request is received in the IPL request receiving unit. The IPL apparatus determining unit receives a transfer ready notification from at least one of the peripheral apparatuses, and determines one peripheral apparatus from which the transfer ready notification is received, as a peripheral apparatus from which the program data is to be transferred to the central processing unit, where the transfer ready notification notifies the IPL controller that the peripheral apparatus holds program data and is ready to transfer the program data to the central processing unit. The IPL request and apparatus notifying unit sends an IPL request and apparatus notification to the central processing unit, where the IPL request and apparatus notification notifies the reception of the IPL request and the peripheral apparatus which is determined in the IPL apparatus determining unit. The central processing unit comprises an IPL request and apparatus notification receiving unit and a program data receiving unit. The IPL request and apparatus notification receiving unit receives the IPL request and apparatus notification, and the program data receiving unit receives the program data which is transferred from the peripheral apparatus which is notified by the IPL request and apparatus notification.

According to the sixth aspect of the present invention, the central processing unit has the same construction as the above fourth aspect of the present invention, but notifies the peripheral apparatus through the IPL controller that it is ready to receive data. The IPL controller comprises an IPL request receiving unit, an IPL request notifying unit, an IPL ready notification receiving unit, an IPL ready state determining unit, an IPL apparatus determining unit, and an IPL apparatus notifying unit.

The IPL request receiving unit receives the IPL request. The IPL request notifying unit sends an IPL request notification notifying reception of the IPL request, to the central processing unit when the IPL request is received in the IPL request receiving unit. The IPL ready notification receiving unit receives an IPL ready notification from the central processing unit. The IPL ready state determining unit determines whether or not the central processing unit is ready to receive the program data, and sends an IPL ready notification to at least one of the plurality of peripheral apparatuses. The IPL apparatus determining unit receives a transfer ready notification from at least one of the peripheral apparatuses, and determines one peripheral apparatus from which the transfer ready notification is received, as a peripheral apparatus from which the program data is to be transferred to the central processing unit. The transfer ready notification notifies the IPL controller that the peripheral apparatus holds program data and is ready to transfer the program data to the central processing unit. The IPL apparatus notifying unit sends an IPL apparatus notification to the central processing unit. The IPL apparatus notification notifies the central processing unit which peripheral apparatus is determined in the IPL apparatus determining unit.

Each of the peripheral apparatuses includes an IPL ready notification receiving unit, a program transfer ready state determining unit, a program transfer ready state notifying unit, and a program data transfer unit. The IPL ready notification receiving unit receives the IPL ready notification. The program transfer ready state determining unit is provided for determining, when the IPL ready notification is received, whether or not the peripheral apparatus holds program data which is to be transferred to the central processing unit, and is ready to transfer the program data to the central processing unit. The program transfer ready state notifying unit sends to the IPL controller the transfer ready notification that the peripheral apparatus which the program transfer ready state notifying unit belongs to, holds program data and is ready to transfer the program data to the central processing unit, when so determined in the program transfer ready state determining unit. The program data transfer unit transfers the program data to the central processing unit after the transfer ready notification is sent by the program transfer ready state notifying unit.

BRIEF DESCRIPTION OF THE DRAWINGS

In the drawings:

FIG. 18 is a block diagram showing a hardware configuration of the second embodiment of the present invention;

FIG. 29 shows an example content of the channel bus interface register 106' of FIG. 25;

FIG. 30 shows an example content of the device status register DSR for the digital exchange system of FIG. 1.

Figure 1:
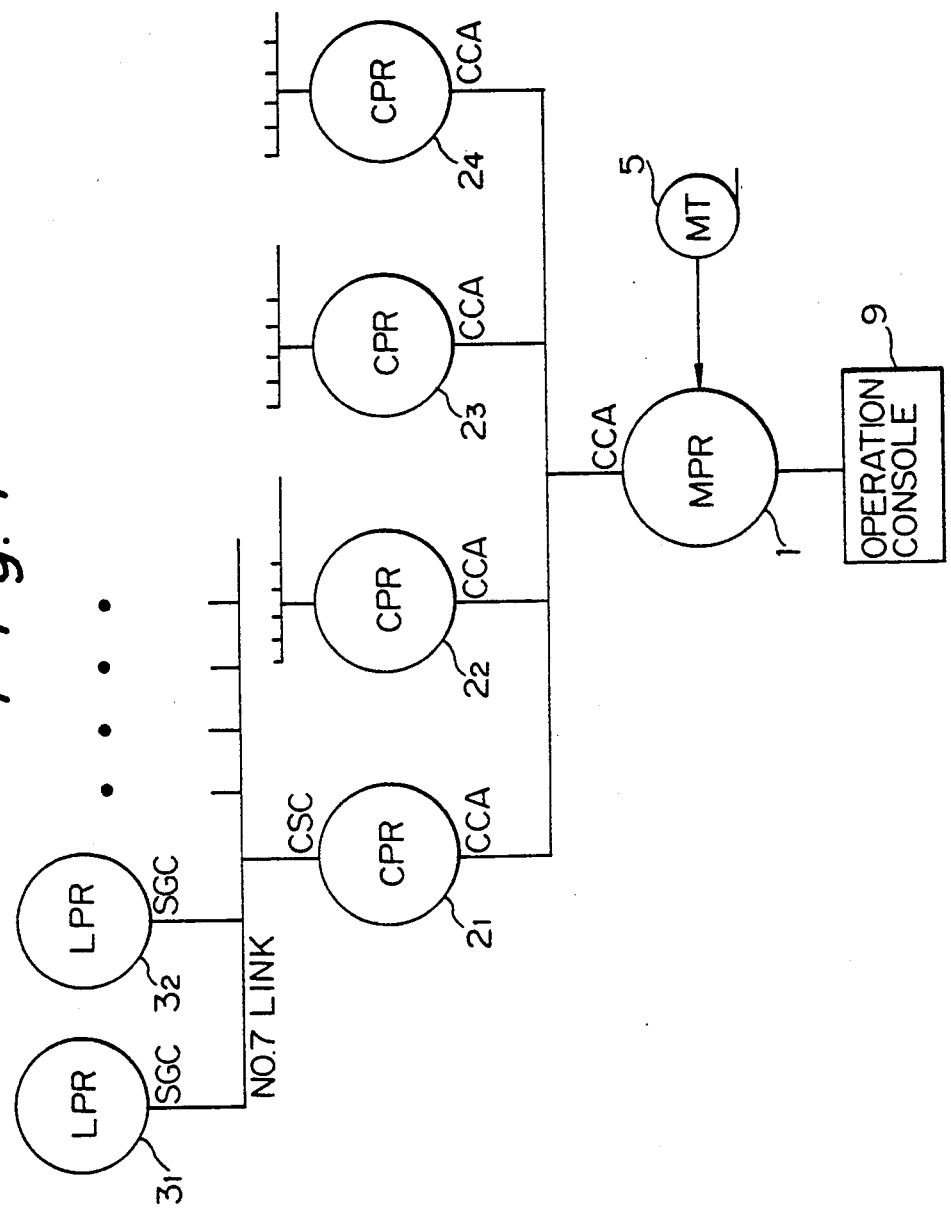
FIG. 1 shows a configuration of a plurality of processors in a digital exchange system.
Figure 2:
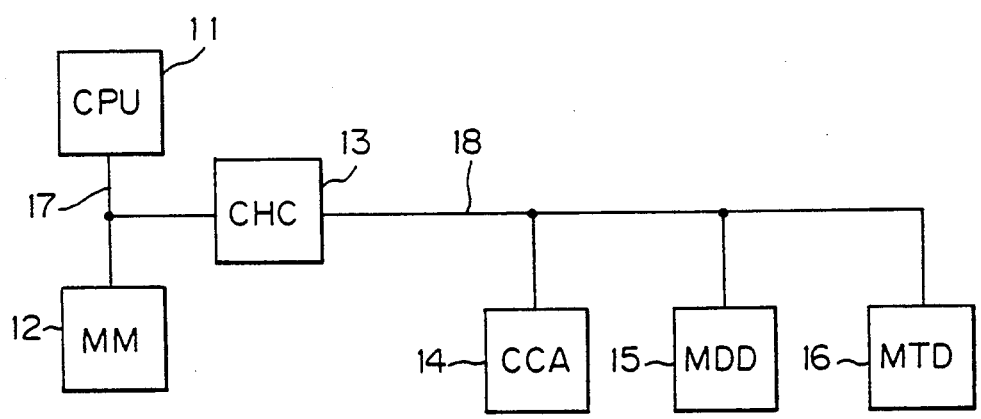
FIG. 2 is a schematic diagram of a processor unit which includes one of the above processors in the conventional distributed information processing system.

DESCRIPTION OF THE PREFERRED EMBODIMENTS (1) Basic Operations of Various Aspects of the Present Invention Before describing the preferred embodiment of the present invention, the basic operations of the various aspects of the present invention are first explained below. Although only one peripheral apparatus is shown in the drawings which show the constructions of these aspects more than one peripheral apparatus can be included in the system to which the respective aspects of the present invention are applied.

Figure 3:
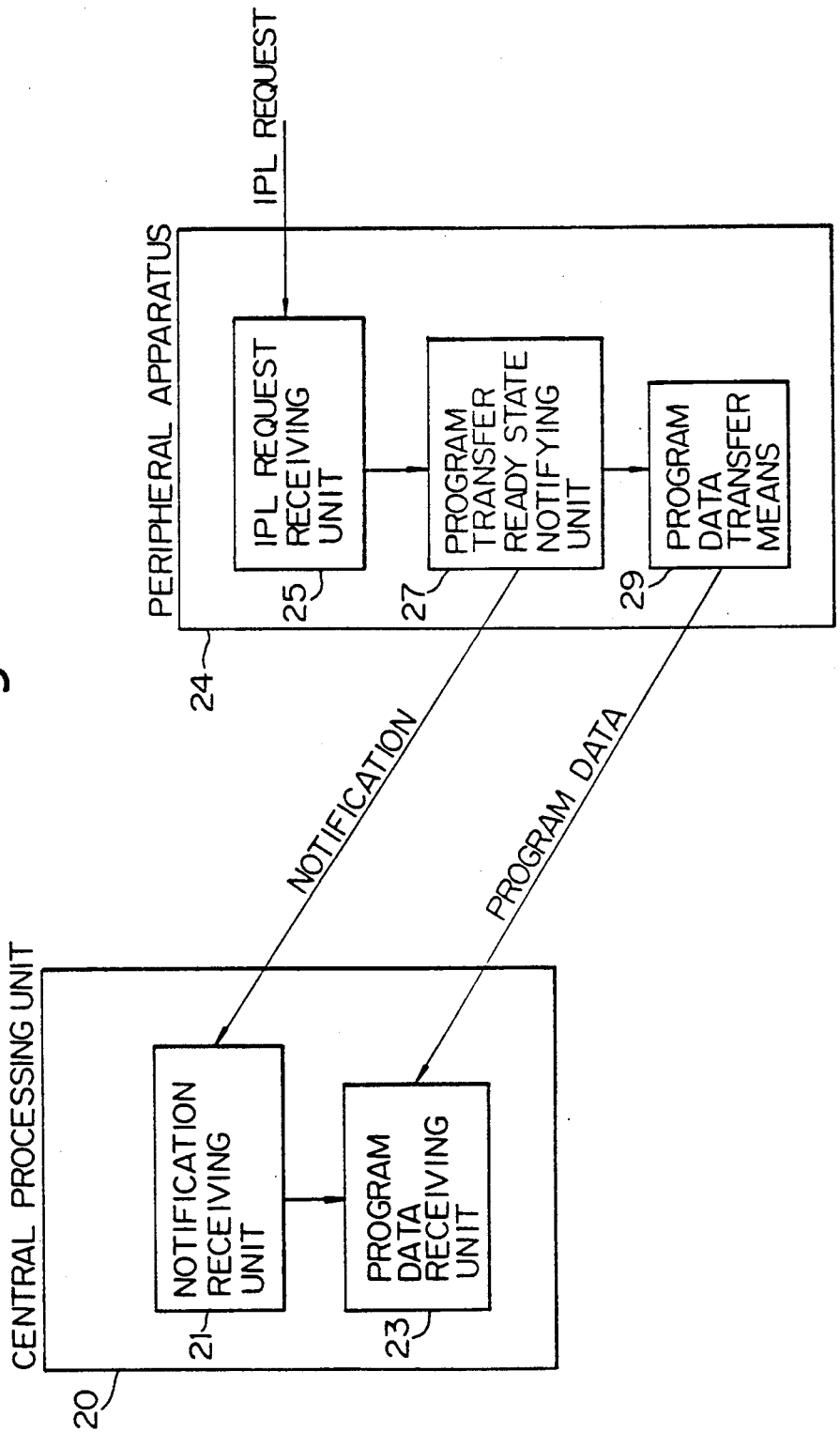
FIG. 3 is a block diagram showing a basic construction of the first aspect of the present invention.

FIG. 3 is a block diagram showing the basic construction of the first aspect of the present invention, which has been described in the summary of the invention. In the construction according to FIG. 3, when the IPL request is received in the IPL request receiving unit 25 in the peripheral apparatus 24, the program transfer ready state notifying unit 27 sends to the notification unit 21 in the central processing unit 20 a notification. This notification notifies the central processing unit 20 that the peripheral apparatus in which the program transfer ready state notifying unit is provided holds program data to be transferred to the central processing unit 20, and is ready to transfer the program data to the central processing unit 20. The program data receiving unit 23 in the central processing unit 20 receives the notification. Then, the program data transfer unit 29 in the peripheral apparatus 24 transfers the program data to the central processing unit 20, and the program data receiving unit 23 in the central processing unit 20 receives the program data.

Thus, in the first aspect of the present invention, by supplying an IPL request to the peripheral apparatus 24 which holds the program data to be loaded in the central processing unit 20, and by notifying the central processing unit 20 when the peripheral apparatus 24 is ready to transfer the program data to the central processing unit 20, the transfer of the program data can be automatically carried out.

Figure 4:
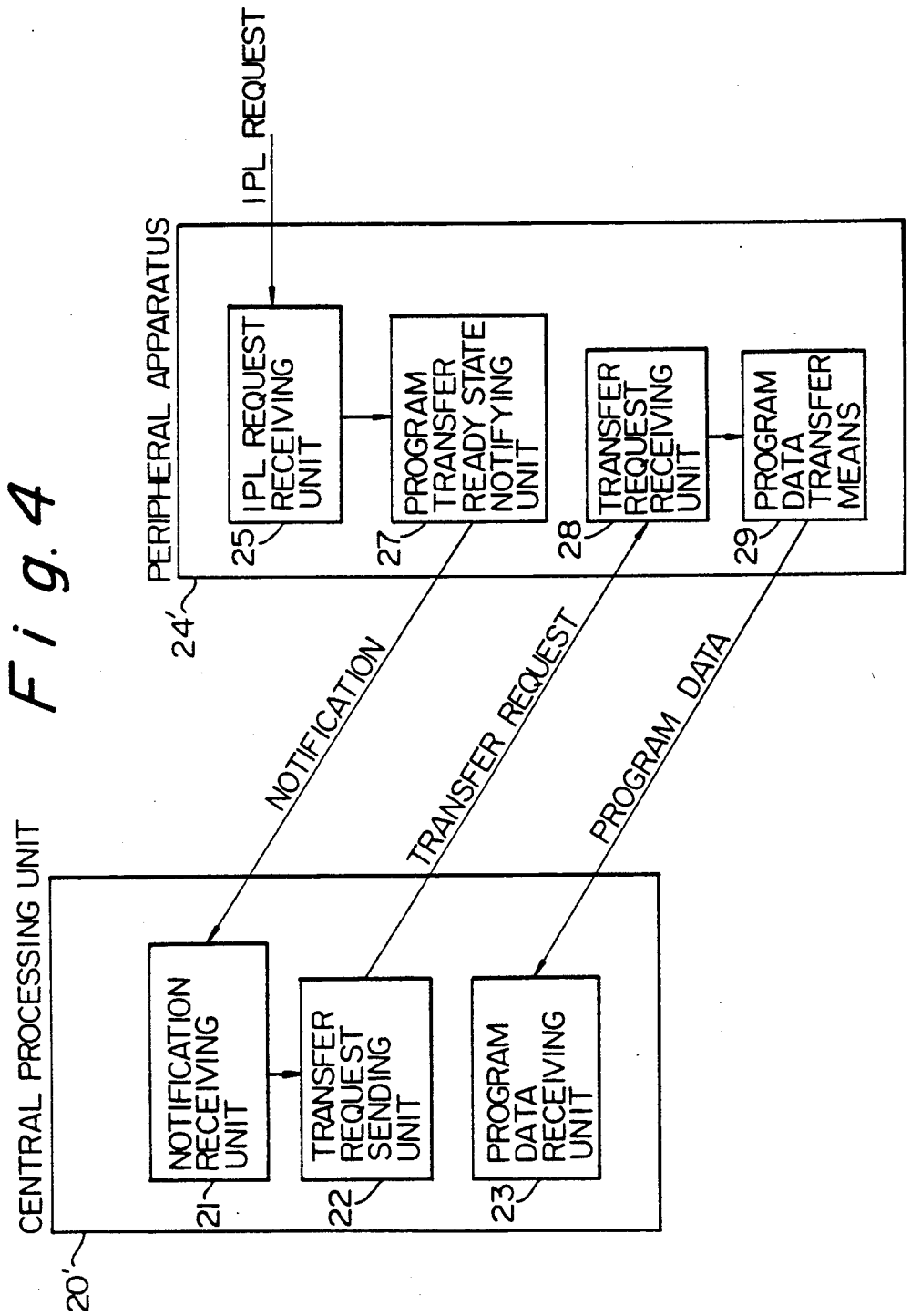
FIG. 4 is a block diagram showing a construction of a variation of the first aspect of the present invention.

FIG. 4 is a block diagram showing a construction of a variation of the first aspect of the present invention. In the construction according to FIG. 4, when the above notification is received in the notification receiving unit 21 in the central processing unit 20', the transfer request sending unit 22 in the central processing unit 20' sends the transfer request to the peripheral apparatus 24' and the transfer request is received by the transfer request receiving unit 28 in the peripheral apparatus 24'. Responding to the transfer request, the program data transfer unit 29 in the peripheral apparatus 24' transfers the program data to the central processing unit 20', and the program data receiving unit 23 in the central processing unit 20' receives the program data.

Figure 5:
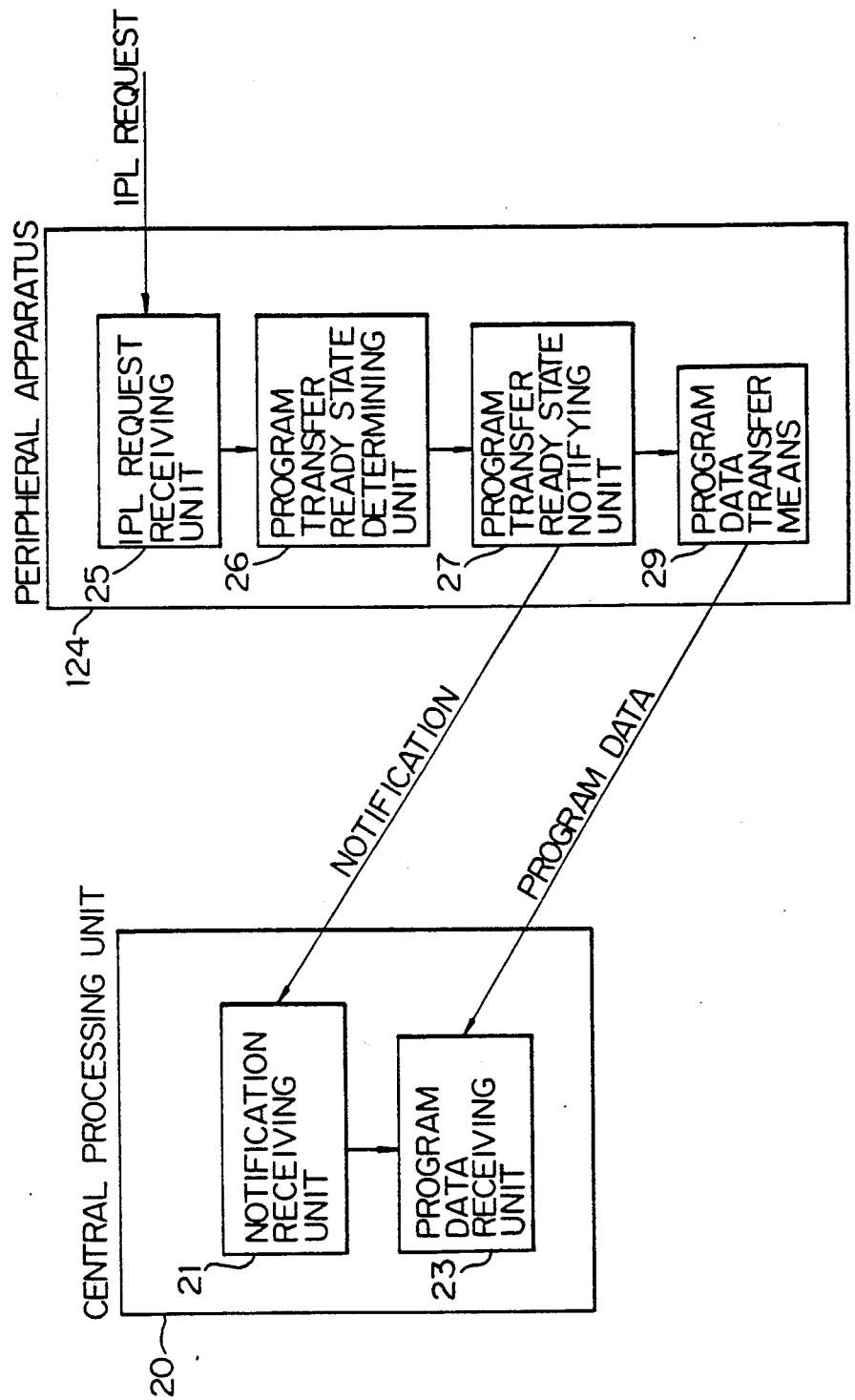
FIG. 5 is a block diagram showing a basic construction of the second aspect of the present invention.

FIG. 5 is a block diagram showing the basic construction of the second aspect of the present invention, which has been described in the summary of the invention. In the construction according to FIG. 5, when the IPL request is received in the IPL request receiving unit 25 in at least one of the peripheral apparatus(es) 124, the program transfer ready state determining unit 26 in the peripheral apparatus(es) 124 determines whether or not the peripheral apparatus in which the program transfer ready state determining unit 26 is provided holds program data to be transferred to the central processing unit 20, and is ready to transfer the program data to the central processing unit 20. When yes (ready to transfer) is determined in the program transfer ready state determining unit 26, the program transfer ready state notifying unit 27 sends the above notification to the central processing unit 20. The operation thereafter is the same as the above first aspect of the present invention. Thus, in the second aspect of the present invention, by supplying an IPL request to the peripheral apparatus(es) including the peripheral apparatus which holds the program data to be loaded in the central processing unit 20, and by notifying the central processing unit 20 when the peripheral apparatus is ready to transfer the program data to the central processing unit 20, only the peripheral apparatus of peripheral apparatuses 124 which holds and is ready to transfer the program data sends the above notification. This peripheral apparatus transfers the program data to the central processing unit 20 by the program transfer ready state notifying unit 27 and the program data transfer unit 29. As a result, the transfer of the program data from the peripheral apparatus ready to transfer the program data, can be automatically carried out.

Figure 6:
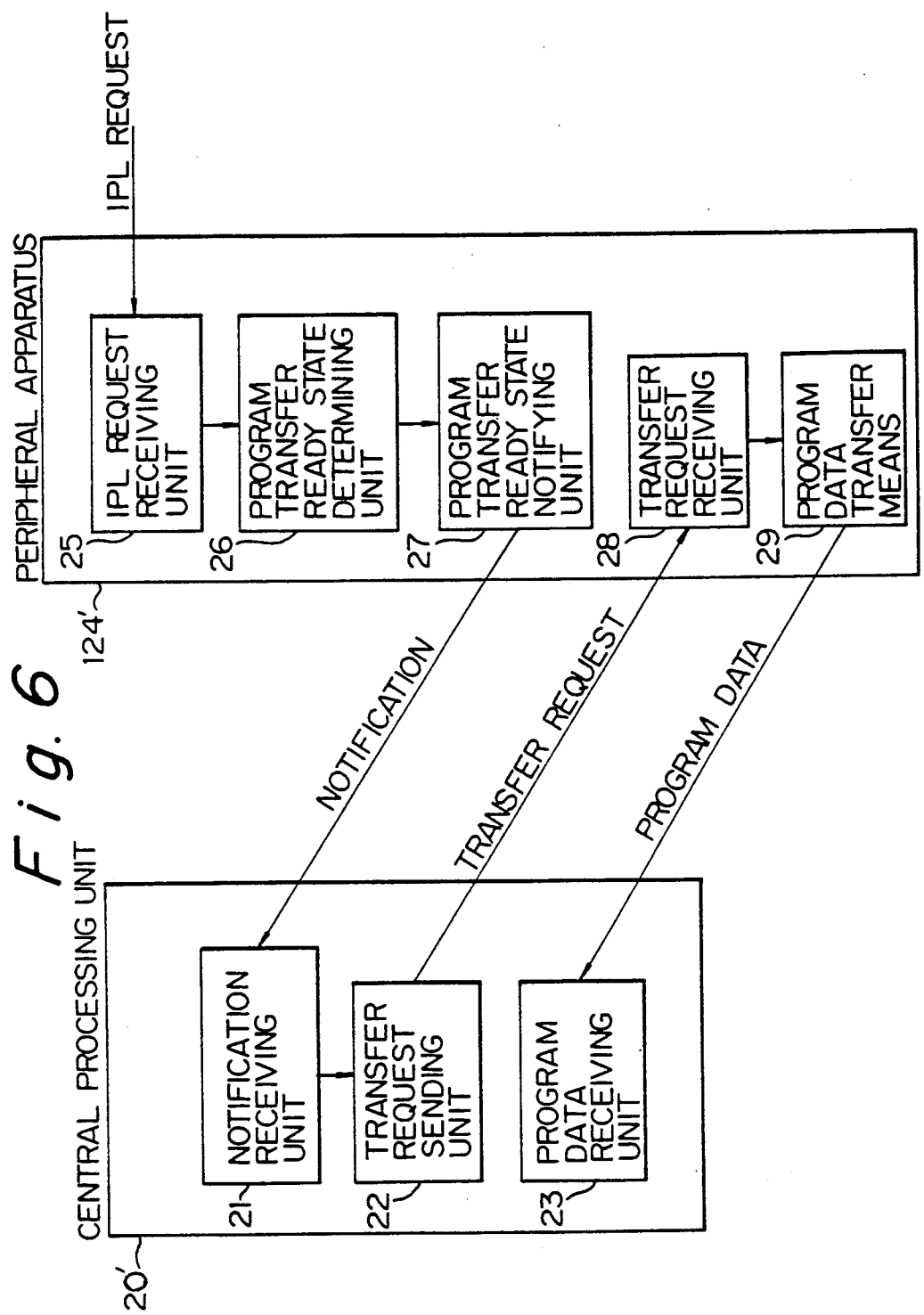
FIG. 6 is a block diagram showing a construction of a variation of the second aspect of the present invention.

FIG. 6 is a block diagram showing a construction of a variation of the second aspect of the present invention. In the construction according to FIG. 6, after the above notification is received in the notification receiving unit 21 in the central processing unit 20, the transfer operation of the program data is carried out in the same way as in the construction shown in FIG. 4.

Figure 7:
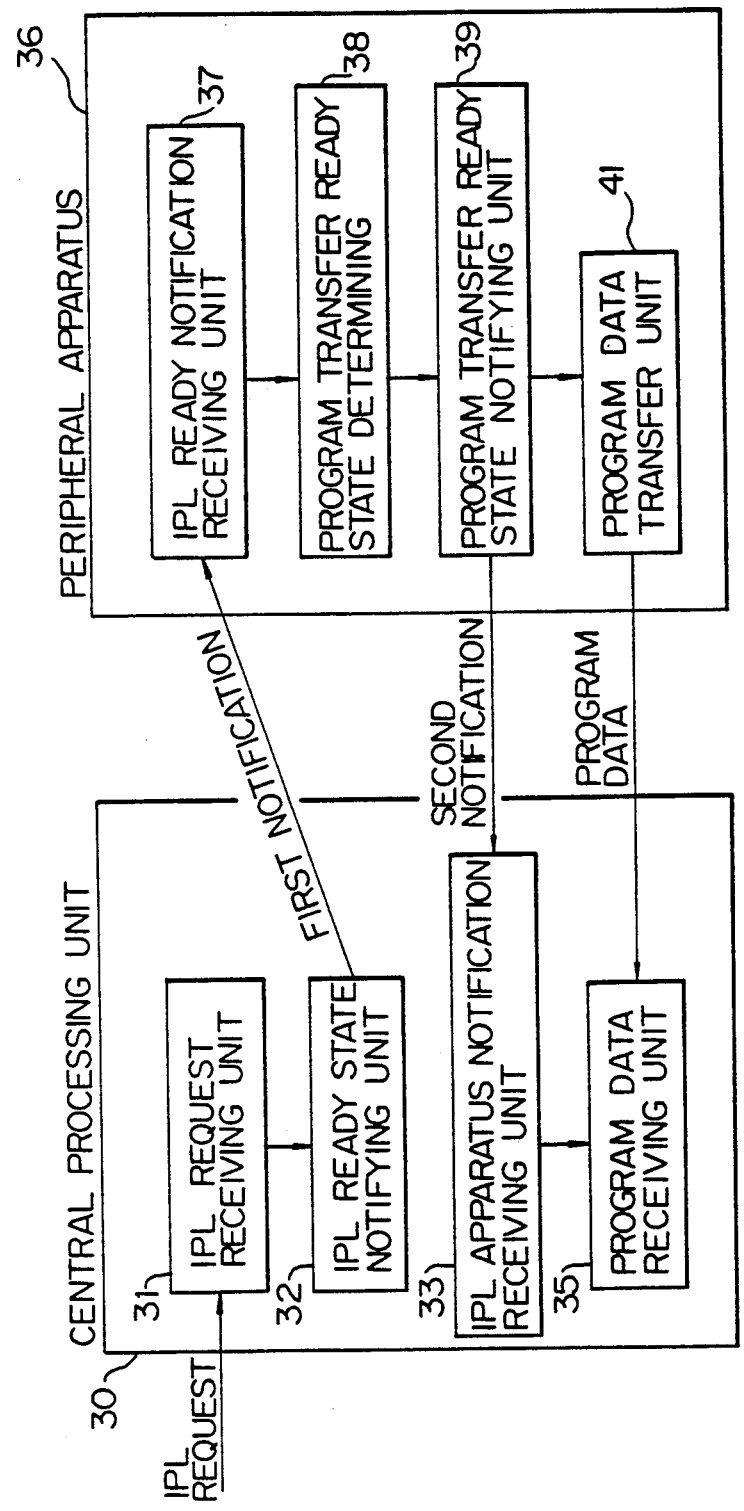
FIG. 7 is a block diagram showing a basic construction of the third aspect of the present invention.

FIG. 7 is a block diagram showing the basic construction of the third aspect of the present invention, which has been described in the summary of the invention. In the construction of FIG. 7, the IPL request is input in the central processing unit 30. When the IPL request is received in the IPL request receiving unit 31 in the peripheral apparatus 30, and the IPL ready state notifying unit 32 determines that the central processing unit 30 is ready to receive the program data, the IPL ready state notifying unit 32 sends a first notification to at least one of the plurality of peripheral apparatuses 36. The first notification notifies the peripheral apparatus that the central processing unit 30 is ready to receive program data which is to be loaded in the central processing unit 30. Although it is assumed that the ready to receive condition is satisfied in the central processing unit 30, a unit for determining satisfaction of this condition can be provided in the central processing unit 30, as will be explained in the first embodiment. The first notification is received by the IPL ready notification receiving unit 37 in each of the peripheral apparatus(es) 36 to which the first notification is sent. Responding to the reception of the first notification, the program transfer ready state determining unit 38 determines whether or not the peripheral apparatus 36 in which the program transfer ready state determining unit 38 is provided holds program data to be transferred to the central processing unit 30, and is ready to transfer the program data to the central processing unit 30. When yes (ready to transfer) is determined in the above program transfer ready state determining unit 38, the program transfer ready state notifying unit 39 sends a second notification to the central processing unit 30. The second notification notifies the central processing unit 30 that the peripheral apparatus in which the program transfer ready state notifying unit is provided holds program data which is to be transferred to the central processing unit 30, and is ready to transfer the program data to the central processing unit 30. The second notification is received in the IPL apparatus notification receiving unit 33 in the central processing unit 30. Then, the program data is transferred from the program data transfer unit 41 in the peripheral apparatus 36 to the program data receiving unit 35 in the central processing unit 30.

Thus, in the third aspect of the present invention, by supplying an IPL request to the central processing unit 30, and by notifying the peripheral apparatuses 36 when the central processing unit 30 is ready to receive the program data, the above first notification is sent to the peripheral apparatuses. When the first notification is received by the IPL ready notification receiving unit 37 in the peripheral apparatus 36 and when the peripheral apparatus is ready to transfer the program data to the central processing unit 30, an operation similar to that described for the second aspect of the present invention is carried out. Thus, the transfer of the program data can be automatically carried out.

Figure 8:
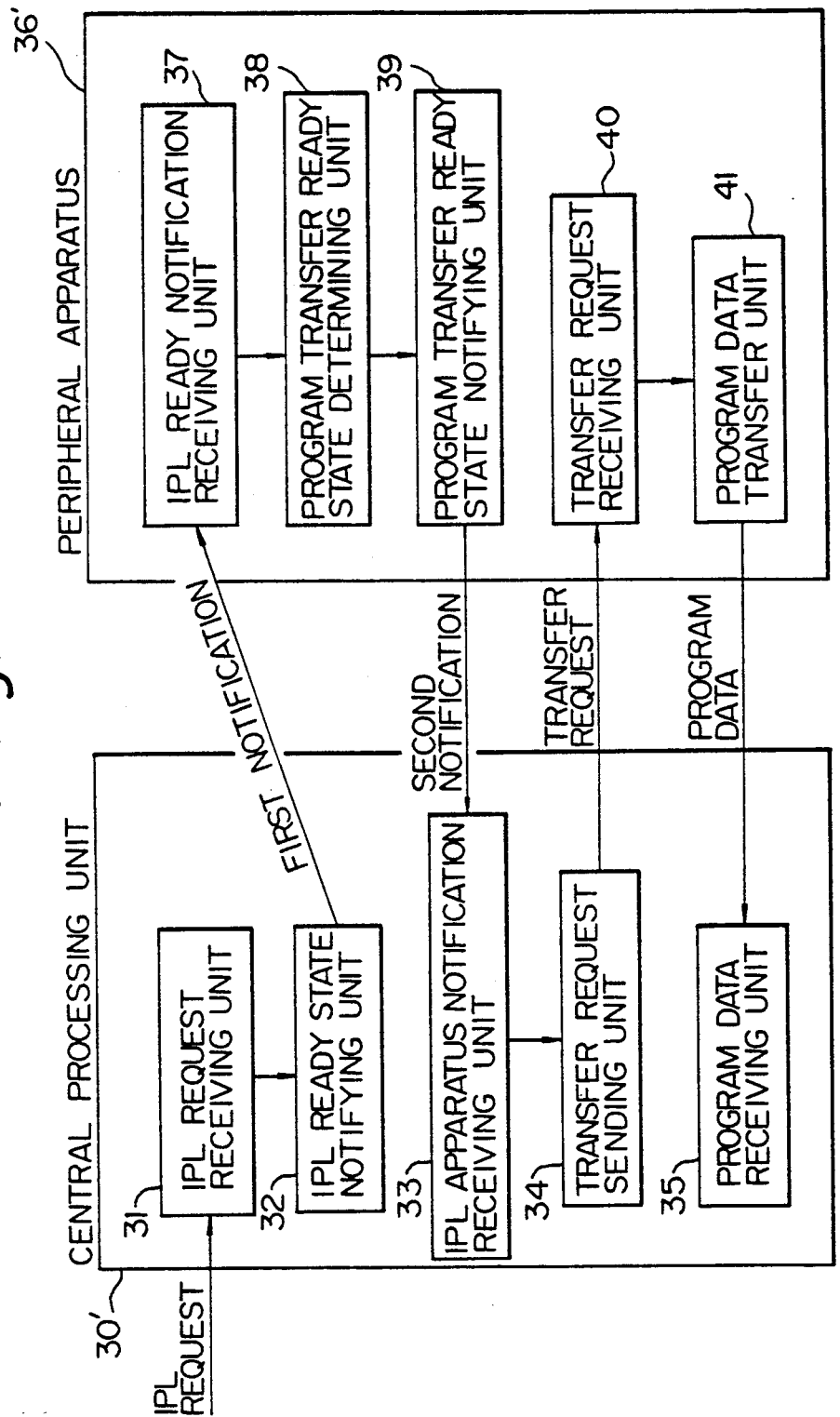
FIG. 8 is a block diagram showing a construction of a variation of the third aspect of the present invention.

FIG. 8 is a block diagram showing a construction of a variation of the third aspect of the present invention. In the construction shown in FIG. 8, after the above second notification is received in the IPL apparatus notification receiving unit 33 in the central processing unit 30', a transfer operation of the program data is carried out in the same way as the construction of FIGS. 4 and 6.

Figure 9:
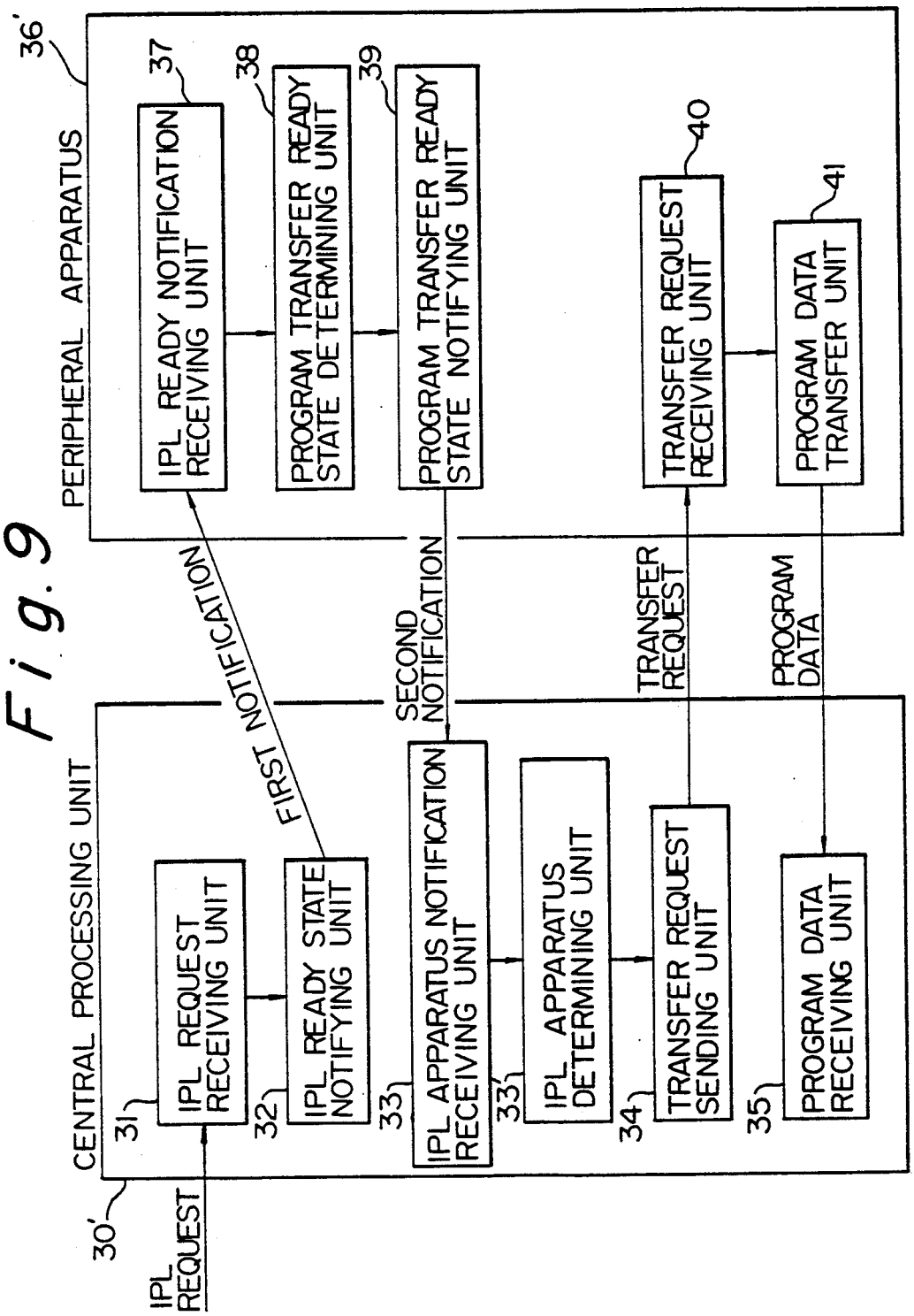
FIG. 9 is a block diagram showing a construction of another variation of the third aspect of the present invention.

FIG. 9 is a block diagram showing a construction of another variation of the third aspect of the present invention. In the construction according to FIG. 9, in addition to the construction of FIG. 8, an IPL apparatus determining unit 33' is provided in the central processing unit 30' for determining one of the peripheral apparatuses from which the above second notification is received in the IPL apparatus notification receiving unit 33 when more than one second notification is received in the IPL apparatus notification receiving unit 30. As a result, the peripheral apparatus is selected from which the program data is to be transferred to the central processing unit 30'. Responding to the determination result of the IPL apparatus determining unit 33', the transfer request sending unit 34 sends the transfer request to the peripheral apparatus which is determined in the IPL apparatus determining unit 33'.

Figure 10:
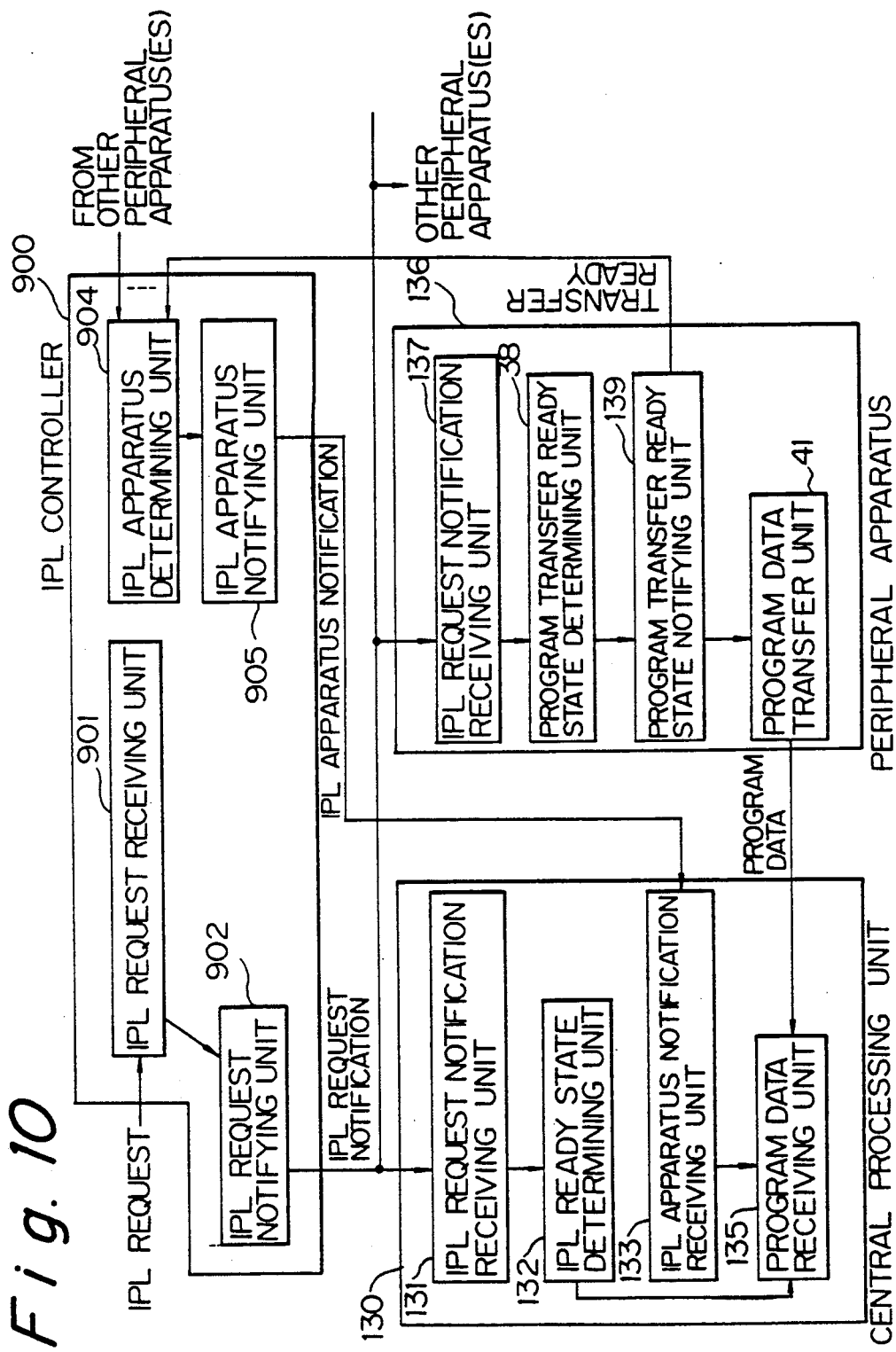
FIG. 10 is a block diagram showing a basic construction of the fourth aspect of the present invention.

FIG. 10 is a block diagram showing a basic construction of the fourth aspect of the present invention, which has been described in the summary of the invention. In the construction according to FIG. 10, the IPL request is input in the IPL controller 900. When the IPL request is received in the IPL request receiving unit 901 in the IPL controller 900, the IPL request notifying unit 902 sends an IPL request notification to the central processing unit 130 and at least one of the plurality of peripheral apparatuses 136, notifying them that an IPL request is received. The IPL request notification is received by the first IPL request notification receiving unit 131 in the central processing unit 130 and by the second IPL request notification receiving unit 137 in each peripheral apparatus 136. In the central processing unit 130, the IPL ready state determining unit 132 determines whether or not the central processing unit 130 is ready to receive program data which is to be loaded in the central processing unit 130. In each peripheral apparatus to which the above IPL request notification is sent, when the IPL request notification is received by the second IPL request notification receiving unit 137, the program transfer ready state determining unit 38 determines whether or not the peripheral apparatus 136 in which the program transfer ready state determining unit 38 is provided, holds program data which is to be transferred to the central processing unit 130, and is ready to transfer the program data to the central processing unit 130. When yes is determined in the above program transfer ready state determining unit 38, the program transfer ready state notifying unit 139 sends a transfer ready notification to the IPL controller 900. The transfer ready notification notifies the IPL controller 900 that the peripheral apparatus in which the program transfer ready state notifying unit 139 is provided, holds program data which is to be transferred to the central processing unit 130, and is ready to transfer the program data to the central processing unit 130. The IPL ready notification from each peripheral apparatus is received in the IPL apparatus determining unit 904 in the IPL controller 900.

In the IPL controller 900, the IPL apparatus determining unit 904 receives the transfer ready notification from each peripheral apparatus which holds program data capable of being transferred to the central processing unit 130 when the peripheral apparatus is ready to transfer the program data to the central processing unit 130. The IPL apparatus determining unit 904 determines one of the peripheral apparatus(es) the peripheral apparatus from which the program data is to be transferred to the central processing unit 130. The peripheral apparatus which is determined in the IPL apparatus determining unit 904 is notified to the central processing unit 130 by an IPL apparatus notification which is sent from the IPL apparatus notifying unit 905. The IPL apparatus notification is received by the IPL apparatus notification receiving unit 133 in the central processing unit 130. Then, if the above IPL ready state determining unit 132 determines that the central processing unit 130 is ready to receive program data, the program data is transferred from the notified peripheral apparatus to the central processing unit 130, by the program data transfer unit 41 in the peripheral apparatus 136 and the program data receiving unit 35 in the central processing unit 130.

Thus, in the fourth aspect of the present invention, by supplying an IPL request to the IPL controller 900, the above IPL request notification is sent to the central processing unit 130 and the peripheral apparatuses. When the IPL request notification is received by the IPL ready notification receiving unit 137' and the peripheral apparatus 136 is ready to transfer the program data to the central processing unit 130, when the IPL request notification is received by the first IPL ready notification receiving unit 131 in the central processing unit 130, and when the central processing unit 130 is ready to receive the program data, an operation similar to that described for the second and third aspects of the present invention, is carried out. Thus, the transfer of the program data can be automatically carried out.

Figure 11:
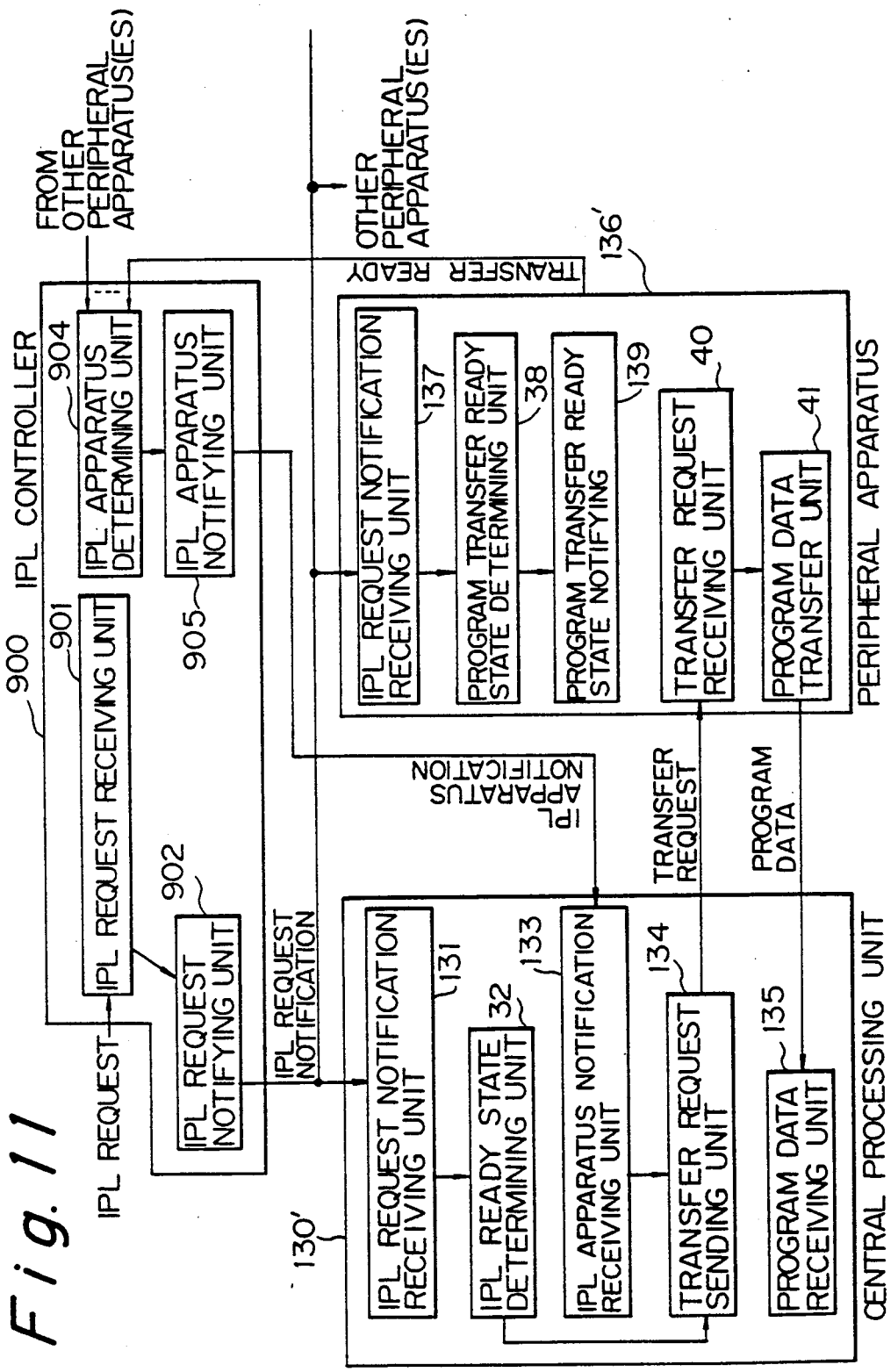
FIG. 11 is a block diagram showing a construction of a variation of the fourth aspect of the present invention.

FIG. 11 is a block diagram showing a construction of a variation of the fourth aspect of the present invention. In the construction according to FIG. 11, in the central processing unit 130, after the above IPL apparatus notification is received in the IPL apparatus notification receiving unit 133, and the IPL ready state determining unit 132 determines that the central processing unit 130 is ready to receive program data, the transfer request sending unit 134 sends a transfer request to the notified peripheral apparatus 136', and the transfer operation of the program data is carried out in the same way as the constructions of FIGS. 4, 6 and 8.

Figure 12:
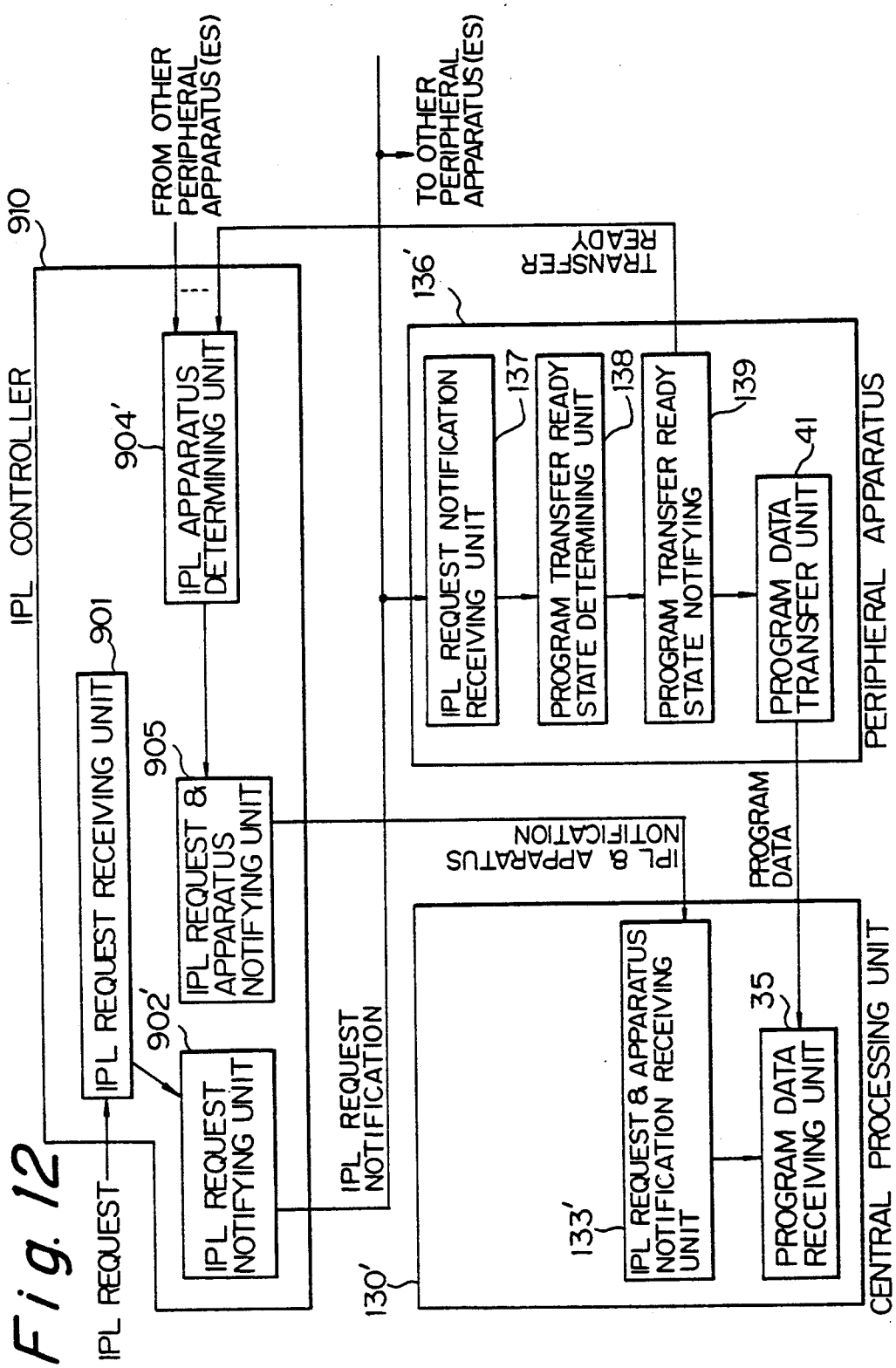
FIG. 12 is a block diagram showing a basic construction of the fifth aspect of the present invention.

FIG. 12 is a block diagram showing a basic construction of the fifth aspect of the present invention, which has been described in the summary of the invention. In the construction of FIG. 12, the IPL request is input in the IPL controller 910. When the IPL request is received in the IPL request receiving unit 901 in the IPL controller 910, the IPL request notifying unit 902' sends an IPL request notification to at least one of the peripheral apparatuses 136, each notifying the peripheral apparatus that an IPL request is received. The IPL request notification is received by the IPL request notification receiving unit 137' in each peripheral apparatus 136. In each peripheral apparatus to which the above IPL request notification is sent, when the IPL request notification is received by the IPL request notification receiving unit 137' in each peripheral apparatus, the program transfer ready state determining unit 138 determines whether or not the peripheral apparatus 136' in which the program transfer ready state determining unit 138 is provided, holds program data which is to be transferred to the central processing unit 130' and is ready to transfer the program data to the central processing unit 130'. When yes is determined in the above program transfer ready state determining unit 138, the program transfer ready state notifying unit 139 sends a transfer ready notification to the IPL controller 910, notifying the IPL controller 910 that the peripheral apparatus in which the program transfer ready state notifying unit 139 is provided, holds program data which is to be transferred to the central processing unit 130' and is ready to transfer the program data to the central processing unit 130'. The transfer ready notification from each peripheral apparatus is received in the IPL apparatus determining unit 904' in the IPL controller 910.

In the IPL controller 910, the IPL apparatus determining unit 904' receives the transfer ready notification from each peripheral apparatus which holds program data that can transferred to the central processing unit 130' and which is ready to transfer the program data to the central processing unit 130', and determines one of the peripheral apparatus(es) from which the program data is to be transferred to the central processing unit 130'. The peripheral apparatus which is determined in the IPL apparatus determining unit 904', is notified to the central processing unit 130' by an IPL request and apparatus notification which is sent from the IPL request and apparatus notifying unit 905. The IPL request and apparatus notification is received by the IPL apparatus notification receiving unit 133', in the central processing unit 130'. Then, the program data is transferred from the peripheral apparatus which is notified by the IPL apparatus notification, to the central processing unit 130, by the program data transfer unit 41 in the peripheral apparatus 136' and the program data receiving unit 35 in the central processing unit 130'.

Namely, by supplying an IPL request to the IPL controller 910, the above IPL request notification is sent to the peripheral apparatuses. When the IPL request notification is received by the IPL ready notification receiving unit 137' in the peripheral apparatus 136' which holds the program data to be loaded in the central processing unit 130' and which is ready to transfer the program data to the central processing unit 130', the transfer ready notification is sent to the IPL controller 910. The above reception of the IPL request and the peripheral apparatus ready to transfer the program data to the central processing unit 130', is notified to the central processing unit 130' by the IPL request and apparatus notification unit 133'. Thereafter, the transfer of the program data can be automatically carried out in the fourth aspect of the present invention.

Figure 13:
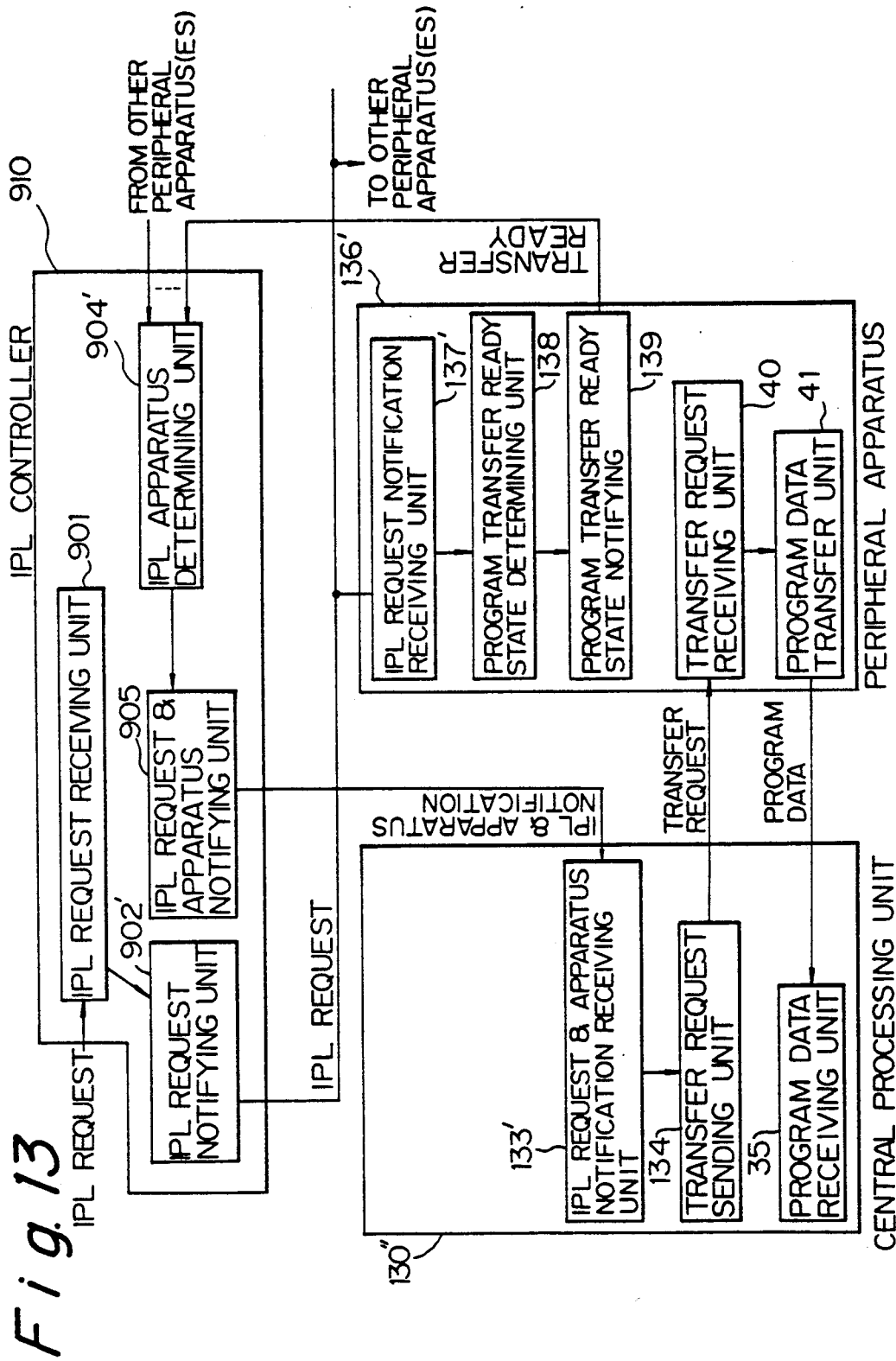
FIG. 13 is a block diagram showing a construction of a variation of the fifth aspect of the present invention.

FIG. 13 is a block diagram showing a construction of a variation of the fifth aspect of the present invention. In the construction according to FIG. 13, in the central processing unit 130', after the above IPL request and apparatus notification is received in the IPL request and apparatus notification receiving unit 133', the transfer request sending unit 134 sends a transfer request to the peripheral apparatus 136' which is notified by the IPL request and apparatus notification, and the transfer operation of the program data is carried out in the same way as the constructions of FIGS. 4, 6, 8, and 10.

Further, in the construction of FIGS. 12 and 13, an IPL ready state determining unit may be provided, as in the fourth aspect of the present invention, for determining whether or not the central processing unit 130 is ready to receive program data before carrying out the above transfer of the program data.

Figure 14:
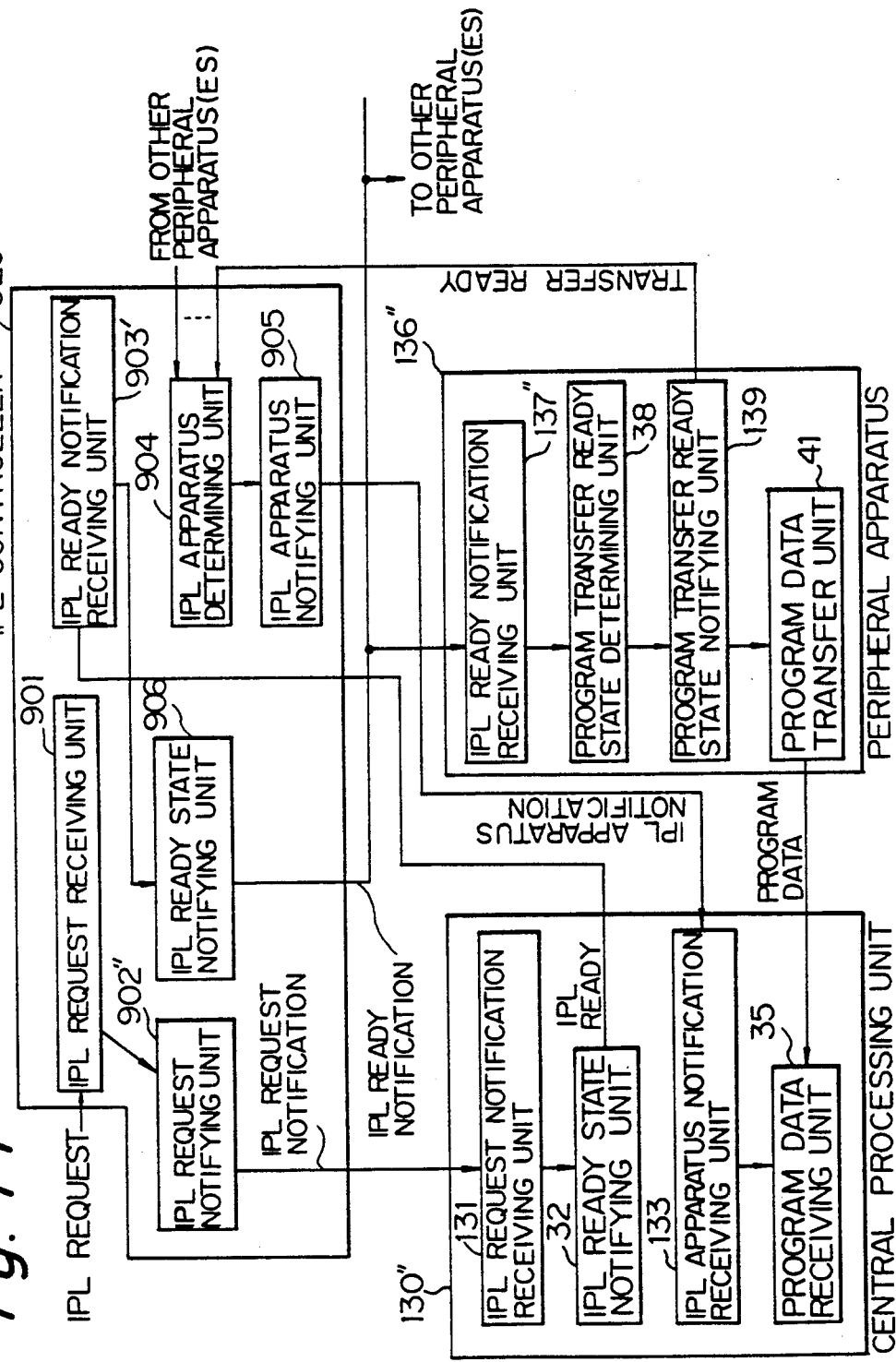
FIG. 14 is a block diagram showing a basic construction of the sixth aspect of the present invention.

FIG. 14 is a block diagram showing a basic construction of the sixth aspect of the present invention, which has been described in the summary of the invention. In the construction of FIG. 14, the IPL request is input in the IPL controller 920. When the IPL request is received in the IPL request receiving unit 901 in the IPL controller 920, the IPL request notifying unit 902" sends an IPL request notification to the central processing unit 130", where the IPL request notification notifies the central processing unit 130" that an IPL request is received.

The IPL request notification is received by the first IPL request notification receiving unit 131 in the central processing unit 130". In the central processing unit 130", the IPL ready state determining unit or notifying unit 32 determines whether or not the central processing unit 130" is ready to receive program data which is to be loaded in the central processing unit 130", and sends an IPL ready notification to the IPL controller 920.

The above IPL ready notification is received by the IPL ready notification receiving unit 903' in the IPL controller 920, and the IPL ready state notifying unit 906 sends an IPL ready notification to at least one of the peripheral apparatuses.

In each peripheral apparatus to which the above IPL ready state notification is sent, when the IPL ready notification is received by the IPL ready notification receiving unit 137' in each peripheral apparatus, the program transfer ready state determining unit 38 determines whether or not the peripheral apparatus 136" in which the program transfer ready state determining unit 38 is provided, holds program data which is to be transferred to the central processing unit 130" and which is ready to transfer the program data to the central processing unit 130". When yes is determined in the above program transfer ready state determining unit 38, the program transfer ready state notifying unit 139 sends a transfer ready notification to the IPL controller 920, notifying the IPL controller 920 that the peripheral apparatus in which the program transfer ready state notifying unit 139 is provided holds program data which is to be transferred to the central processing unit 130" and which is ready to transfer the program data to the central processing unit 130". The transfer ready notification from each peripheral apparatus is received in the IPL apparatus determining unit 904 in the IPL controller 920.

In the IPL controller 920, the IPL apparatus determining unit 904 receives the transfer ready notification from each peripheral apparatus which holds program data that can be transferred to the central processing unit 130" and which is ready to transfer the program data to the central processing unit 130", and determines one of the peripheral apparatus(es) from which the program data is to be transferred to the central processing unit 130". The peripheral apparatus which is determined in the IPL apparatus determining unit 904, is notified to the central processing unit 130" by an IPL apparatus notification sent from the IPL apparatus notifying unit 905. The IPL apparatus notification is received by the IPL apparatus notification receiving unit 133 in the central processing unit 130". Then, the program data is transferred from the peripheral apparatus which is notified by the IPL apparatus notification, to the central processing unit 130", by the program data transfer unit 41 in the peripheral apparatus 136" and the program data receiving unit 35 in the central processing unit 130".

Thus, in the sixth aspect of the present invention, an IPL request is first supplied to the IPL controller 920, and the IPL request notification is sent to the central processing unit 130". Then, when it is determined that the central processing unit 130" is ready to receive the program data in the central processing unit 130", the determination result is notified to the IPL controller 920. Responding to the notification, the IPL controller 920 sends a notification that the IPL request is received and the central processing unit 130" is ready to receive the program data, to at least one of the peripheral apparatuses. Thereafter, an operation similar to that described for the fourth and fifth aspects of the present invention, is carried out. Thus, the transfer of the program data can be automatically carried out.

Figure 15:
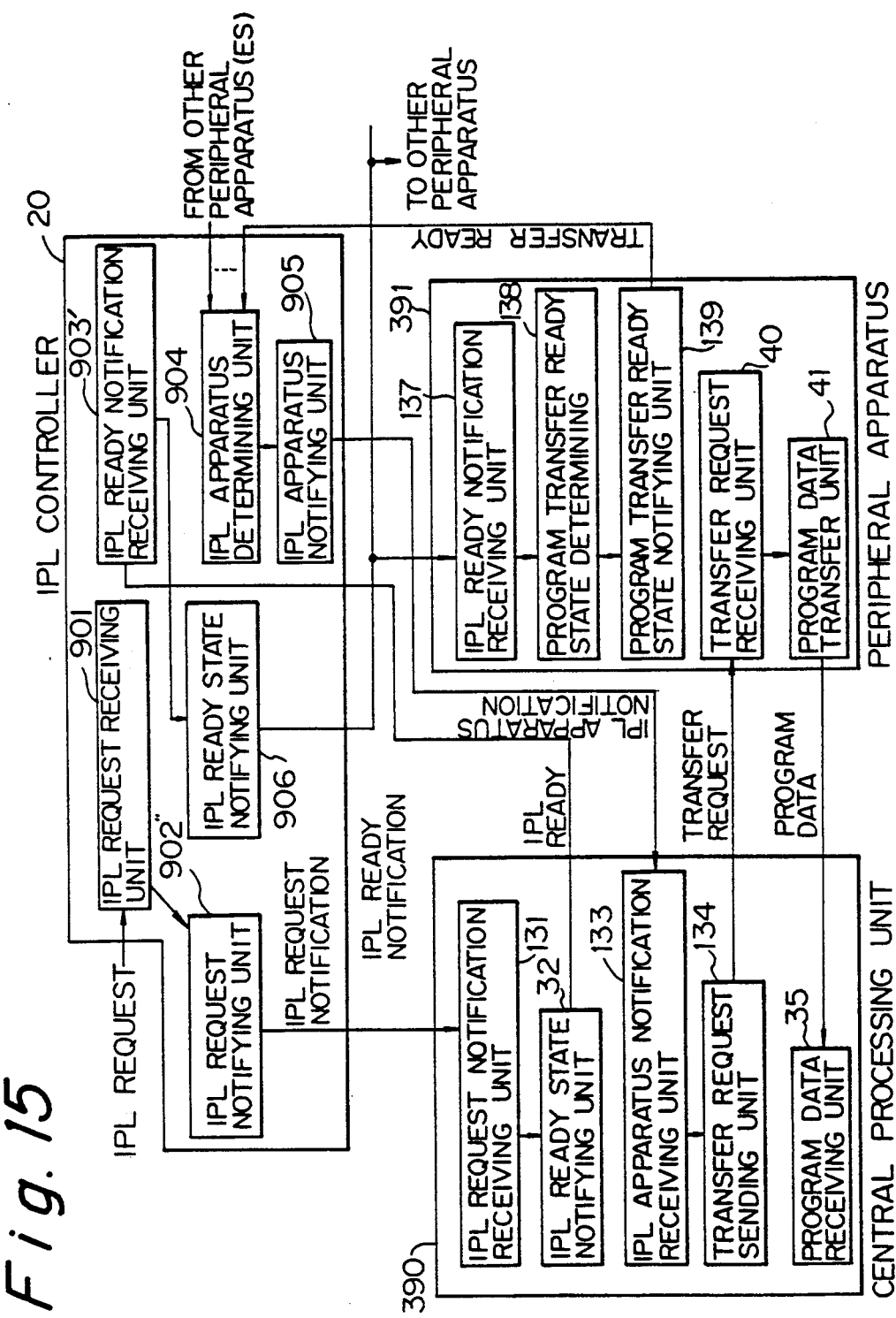
FIG. 15 is a block diagram showing a construction of a variation of the sixth aspect of the present invention.

FIG. 15 is a block diagram showing a construction of a variation of the sixth aspect of the present invention. In the construction of FIG. 15, in the central processing unit 390, after the above IPL apparatus notification is received in the IPL apparatus notification receiving unit 133, the transfer request sending unit 134 sends a transfer request to the peripheral apparatus 391 which is notified by the IPL apparatus notification, and the transfer operation of the program data is carried out in the same way as the constructions of FIGS. 4, 6, 8, 11, and 13.

As explained later in the embodiments, the functions of all the above units provided in the central processing units, the peripheral apparatuses, and the IPL controllers in the various aspects of the present invention, can be realized by software.

(2) First Embodiment

Figure 16:
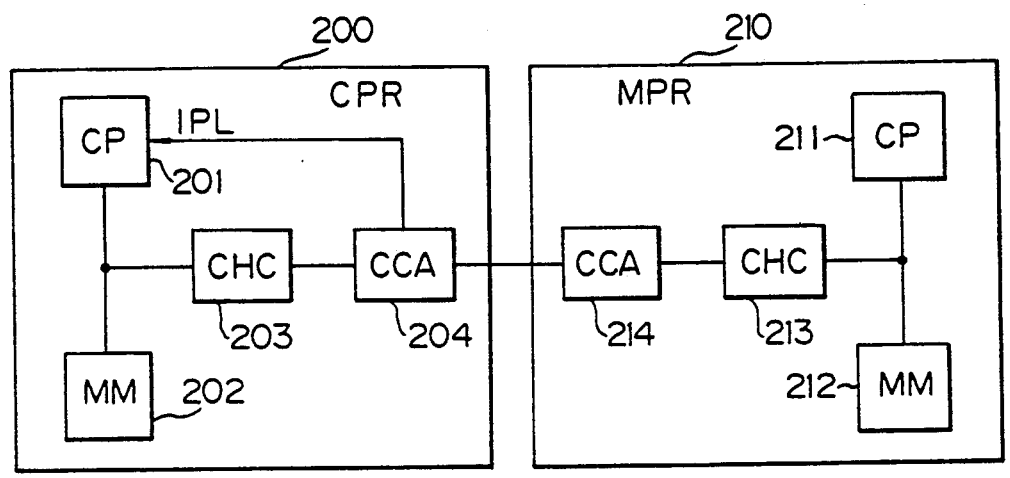
FIG. 16 is a block diagram showing a construction of the first embodiment of the present invention.

FIG. 16 is a block diagram showing a construction of the first embodiment of the present invention. FIG. 16 shows one of the call processor $2_i$ ($i=1, 2, 3, \ldots$) and the management processor 1 in the digital exchange system of FIG. 1 to show an initial program loading system for the call processor $2_i$. In the construction of FIG. 16, reference numeral 200 denotes a call processor and 210 denotes a management processor. 201 denotes a central processor in the call processor 200, 202 denotes a main memory in the call processor 200, 203 denotes a channel controller in the call processor 200, and 204 denotes a channel-to-channel adapter in the call processor 200. 211 denotes a central processor in the management processor 210, 202 denotes a main memory in the management processor 210, 203 denotes a channel controller in the management processor 210, and 204 denotes a channel-to-channel adapter in the management processor 210. The channel-to-channel adapter 204 in the call processor 200 and the channel-to-channel adapter 214 in the management processor 210 are connected to each other, and therethrough the call processor 200 and the management processor 210 are connected to each other. Although the basic functions of the respective elements in the construction of FIG. 16, are the same as the corresponding elements of the construction of FIG. 4, the invention with the construction of FIG. 16 further functions as explained below according to the present invention.

When an IPL request is input into the management processor 210 from an operation panel (not shown), an IPL request signal is input to the central processor 211 in the management processor 210. The IPL request signal is transmitted through the channel controller 213 and the channel-to-channel adapter 214 to the channel-to-channel adapter 204. Receiving the IPL request signal, the channel-to-channel adapter 204 inputs an interrupt signal for the IPL request to the central processor 201. Responding to the interrupt signal, a microprogram for the initial program loading operation starts.

Figure 17:
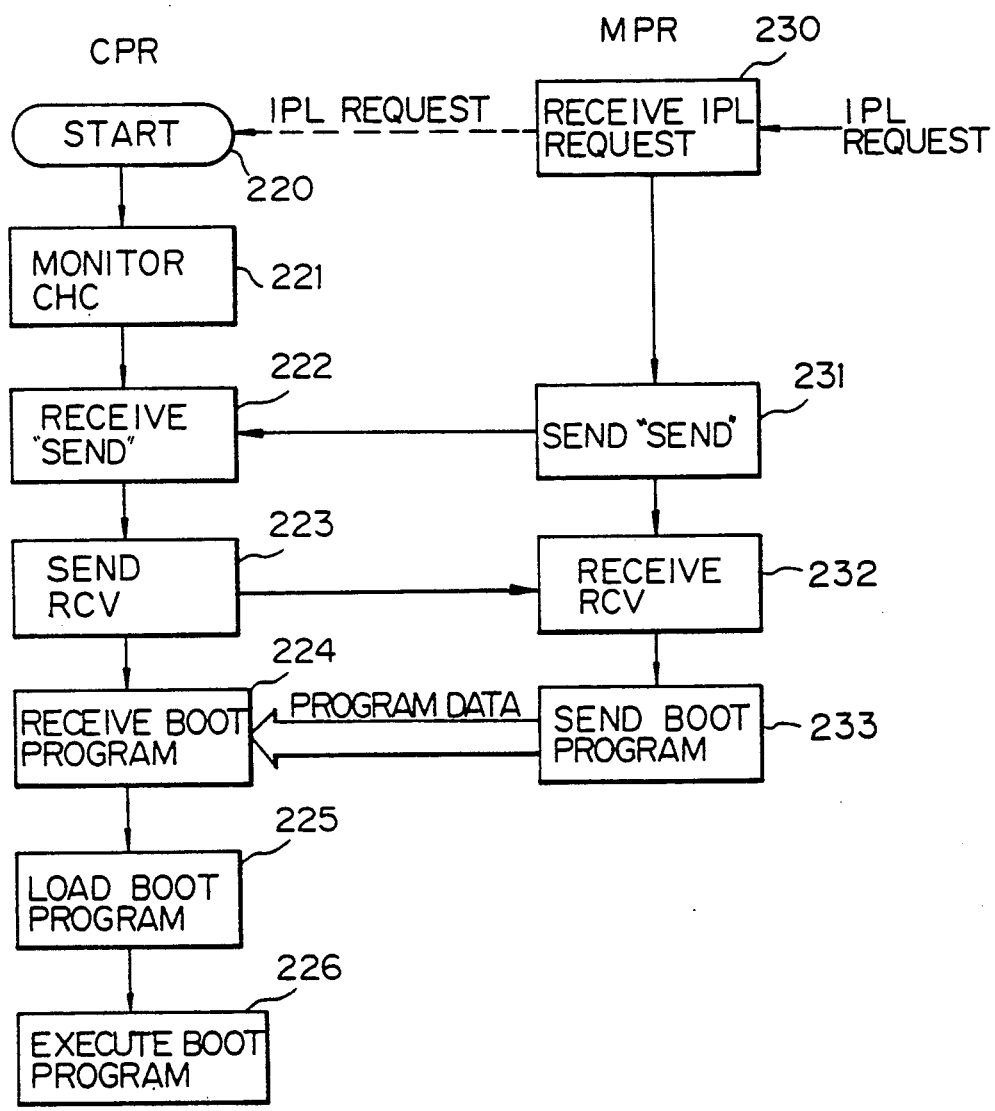
FIG. 17 is a flowchart of the operation of loading the bootstrap loader in the construction of FIG. 15.

FIG. 17 is a flowchart of the operation of loading the bootstrap loader in the construction of FIG. 16. In FIG. 17, in the step 230, the management processor 210 sends a notification of a reception of an IPL request, to the call processor 200. Receiving the notification, the call processor 200 starts an operation of the initial program loading in the step 220. Then, the call processor 200 waits for an interrupt from the management processor 210 for a transfer of the bootstrap loader in the step 221. On the other hand, after sending the above notification in the step 230, the management processor 210 sends an interrupt signal SEND to the call processor 200 through the channel-to-channel adapter 214 in the step 231. Receiving the interrupt signal SEND in the step 222, the call processor 200 returns a RCV (receive) signal through the channel-to-channel adapter 204 to the management processor 210 in the step 223 for notifying the management processor 210 that the call processor 200 is ready to receive a transfer of program data of the bootstrap loader. The bootstrap loader may be stored in advance in the magnetic tape device 215 connected to the management processor 210. Receiving the RCV signal in the step 232, the management processor 210 reads the program data of the bootstrap loader from the magnetic tape device 215, and transfers the bootstrap loader to the call processor 200 through the channel controllers 213 and 203 in the management processor 210 and the call processor 200 in the step 233. The call processor 200 receives the bootstrap loader, and stores the program data in the main memory 202 in the step 224.

Further, in the above first embodiment, the central processor 211 in the management processor 210 can have the aforementioned function of the program transfer ready state determining unit 38 of FIG. 7.

(3) Second Embodiment

FIG. 18 is a block diagram showing a construction of the second embodiment of the present invention. In FIG. 18, reference numeral 50 denotes a central processor and 51 denotes a main memory. 52 denotes a system bus, 53 denotes a channel controller, and 54 denotes a signal line. 55 denotes an IPL control circuit and 56, 57, and 65 each denote an input and output (I/O) control signal line. 58 denotes an input and output (I/O) bus, 59, 60, ... and 63 each denote an input and output (I/O) controller, and 61, 62, ... and 64 each denote an input and output (I/O) device. Generally, either of the I/O devices 61, 62, ... and 64 can hold program data which is to be loaded in the main memory 51 through the corresponding I/O controllers 59, 60, ... or 63 and the channel controller 53.

The operation of the construction of FIG. 18 for loading a bootstrap loader is as follows.

When an IPL request is input into the IPL control circuit 55, for example, from an operation panel (not shown), the IPL control circuit 55 outputs an IPL signal onto the initial program loading control signal line 54. The IPL signal is input into the central processor 50. Receiving the IPL signal, the central processor 50 is reset to an initial state (system reset). Then, the IPL control circuit 55 sends a first notification signal to the I/O controllers 59, 60, and 63 through the I/O control signal lines 56, 57, and 65, respectively, where the first notification signal notifies that the central processor 50 is in the initial state and is ready for initial program loading. Receiving the first notification signal, each of the I/O controllers 59 and 60 determines whether or not the corresponding I/O device 61, 62, ... or 64 holds program data of a bootstrap loader which is to be transferred to the central processor 50, and whether the device is prepared to transfer the program data to the central processor 50. If yes is determined, the I/O controller 59, 60, ... or 63 sends a second notification signal to the IPL control circuit 55 through the corresponding I/O control signal line 56, 57, or 65, where the second notification notifies the IPL control circuit 55 that the corresponding I/O device 61, 62, ... or 64 holds the program data which is to be transferred to the central processor 50, and is prepared to transfer the program data to the central processor 50. Receiving the second notification, the IPL control circuit 55 notifies the central processor 50 of which I/O device is prepared to transfer the program data of a bootstrap loader to the central processor 50. Responding to the third notification, the central processor 50 sends a transfer request for the bootstrap loader through the system bus 52 and the channel controller 53 to the I/O controller which corresponds to the I/O device notified by the above third notification. Then, a transfer of the program data of the bootstrap loader is carried out from the above I/O device to the main memory 51 through the corresponding I/O controller, the channel controller 53, and the system bus 52. When the transfer of the program data of the bootstrap loader is completed, the above I/O controller or the channel controller 53 notifies this completion to the central processor 50. Receiving the notification of the completion of the transfer, the central processor 50 starts execution of the bootstrap loader.

Figure 19:
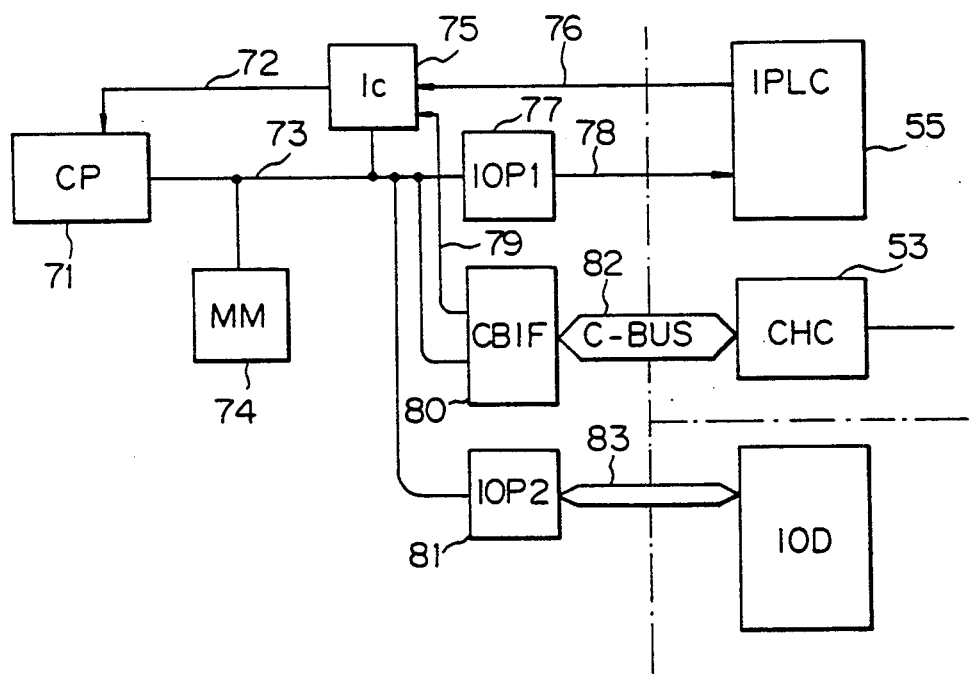
FIG. 19 is a block diagram showing an example construction of the I/O controller 59, 60, . . . or 63 in FIG. 18.

FIG. 19 is a block diagram showing an example construction of the I/O controller 59, 60, ... or 63 in FIG. 18. In FIG. 19, reference numeral 71 denotes a central processor, 72 denotes an interrupt signal line, 73 denotes an internal system bus, 74 denotes a main memory, and 75 denotes an interrupt control circuit. 76 denotes a signal line for the above first notification signal, 77 denotes an I/O port for communicating with the IPL control circuit 55, 78 denotes a signal line for the above third notification signal, 80 denotes a channel bus interface circuit, and 81 denotes an I/O port for communicating with the I/O device 61, 62, ... or 64. 82 denotes a channel bus, and 83 denotes a signal line between the I/O controller and the I/O device 61, 62, . . . or 64. The central processor 71 controls the operations of the I/O controller. The channel bus interface circuit 80 is an interface circuit for communicating with the channel controller 53.

The operation of the construction of FIG. 19 for loading a bootstrap loader is as follows.

The interrupt control circuit 75 outputs an interrupt signal to the central processor 71 when the interrupt control circuit 75 receives the first notification signal. Receiving the interrupt signal, the central processor 71 starts an interrupt processing program for loading a bootstrap loader, where the interrupt processing program is installed in the main memory 74.

Figure 20:
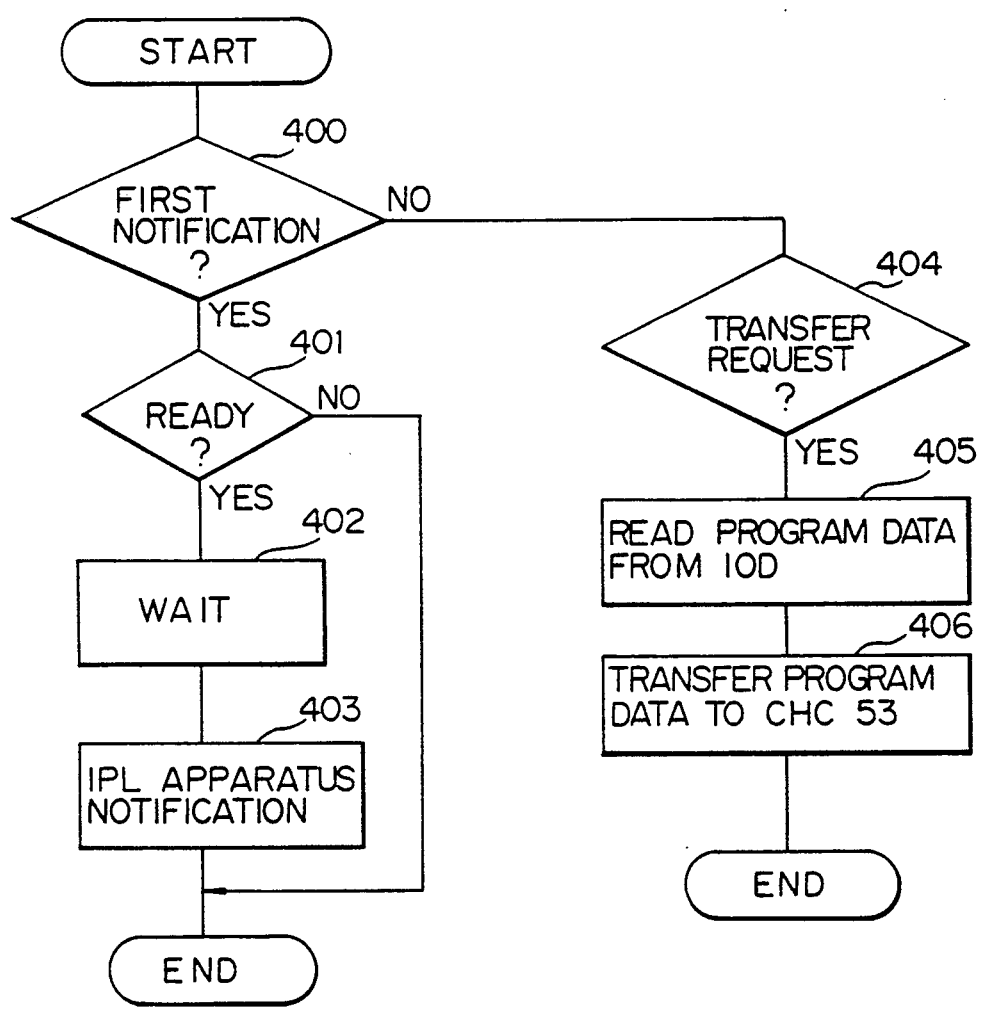
FIG. 20 is a flowchart of an example operation of the interrupt processing program.

FIG. 20 is a flowchart of an example operation of the interrupt processing program. In the process of FIG. 20, in the step 400, it is determined whether or not the interrupt signal is generated due to the above first notification signal. The information on the cause of the interrupt signal is contained in the above interrupt signal. That is, for example, the interrupt signal indicates that the interrupt signal is generated due to the above first notification signal by a predetermined pattern. When, in the step 400, it is determined that the interrupt signal is generated due to the above first notification signal, the operation goes to the step 401, and it is determined whether or not the corresponding I/O device is in a state satisfying the following two conditions:

(a) the bootstrap loader is installed in the I/O device; and
(b) the I/O device is connected to the I/O controller through the I/O port 81, and is able to transfer the bootstrap loader to the central processor 50.

When it is determined that the above conditions are satisfied in he step 401, the operation goes to the step 402 to wait for a predetermined time. The waiting time is memorized in the main memory 74 in advance. After waiting for the predetermined time, in the step 403, the above-mentioned second notification is sent to the central processing unit 50 through the IPL control circuit 55, and this sequence is completed. The waiting time is determined based on the priority order of the corresponding I/O device among the plurality of I/O devices 59, 60, . . . and 63 which are connected to the central processing unit 50 of FIG. 18. Namely, a shorter waiting time is determined for an I/O device of a higher priority. Thereby, the IPL control circuit 55 can receive first (therefore the central processing unit 50 receives) the above third notification from an I/O controller in which the shortest waiting time is memorized, and the transfer request responding to the third notification is sent to the above I/O controller only. Thus, the transfer of the bootstrap loader is carried out from the I/O device connected to the I/O controller. The priority order can be set in the system of FIG. 18 in another way instead of the above operation of the step 402 of FIG. 20, for example, by an operation comprised of the steps 501 and 506 of FIG. 22 which is explained later.

When the above-mentioned transfer request for the bootstrap loader is transferred from the central processing unit 50 to the channel bus interface circuit 80 through the channel controller 53, the channel bus interface circuit 80 outputs an interrupt signal to the central processor 71. Receiving the interrupt signal, the central processor 71 starts the interrupt processing program of FIG. 20 again. The interrupt signal indicates that the interrupt signal is generated due to the above transfer request signal, for example, by a predetermined pattern. In the step 400, it is determined that the interrupt signal is not generated due to the above first notification signal, and the operation goes to the step 404. In the step 404, the cause of the interrupt is determined as the transfer request for the bootstrap loader based on the above predetermined pattern, and then the operation goes to the step 405. The central processor 71 reads the program data of the bootstrap loader from the corresponding I/O device 62 in the step 405, and transfers the program data to the main memory 51 of FIG. 13 through the channel controller 53.

Figure 21:
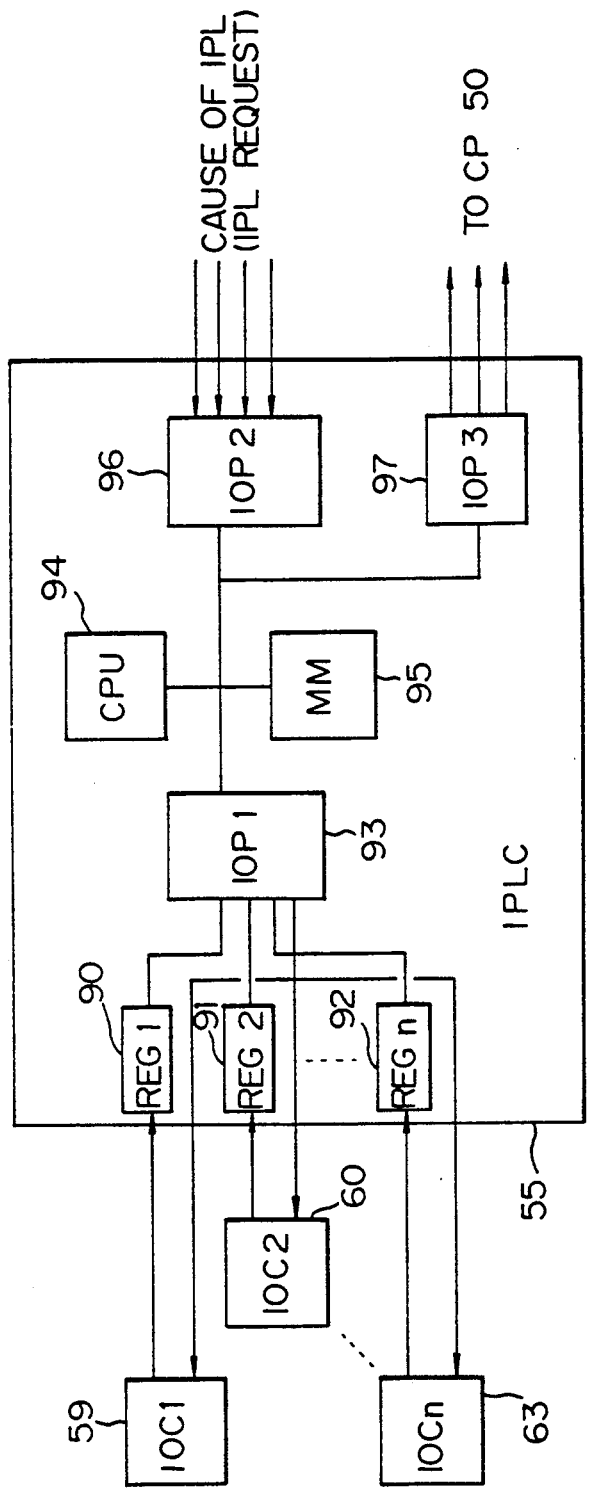
FIG. 21 is a block diagram showing an example construction of the IPL control circuit 55 in FIG. 18.

FIG. 21 is a block diagram showing an example construction of the IPL control circuit 55 in FIG. 18. In FIG. 21, reference numerals 90, 91, and 92 each denote an input register, 93, 96, and 97 each denote an I/O port, 94 denotes a central processor, and 95 denotes a main memory.

Figure 22:
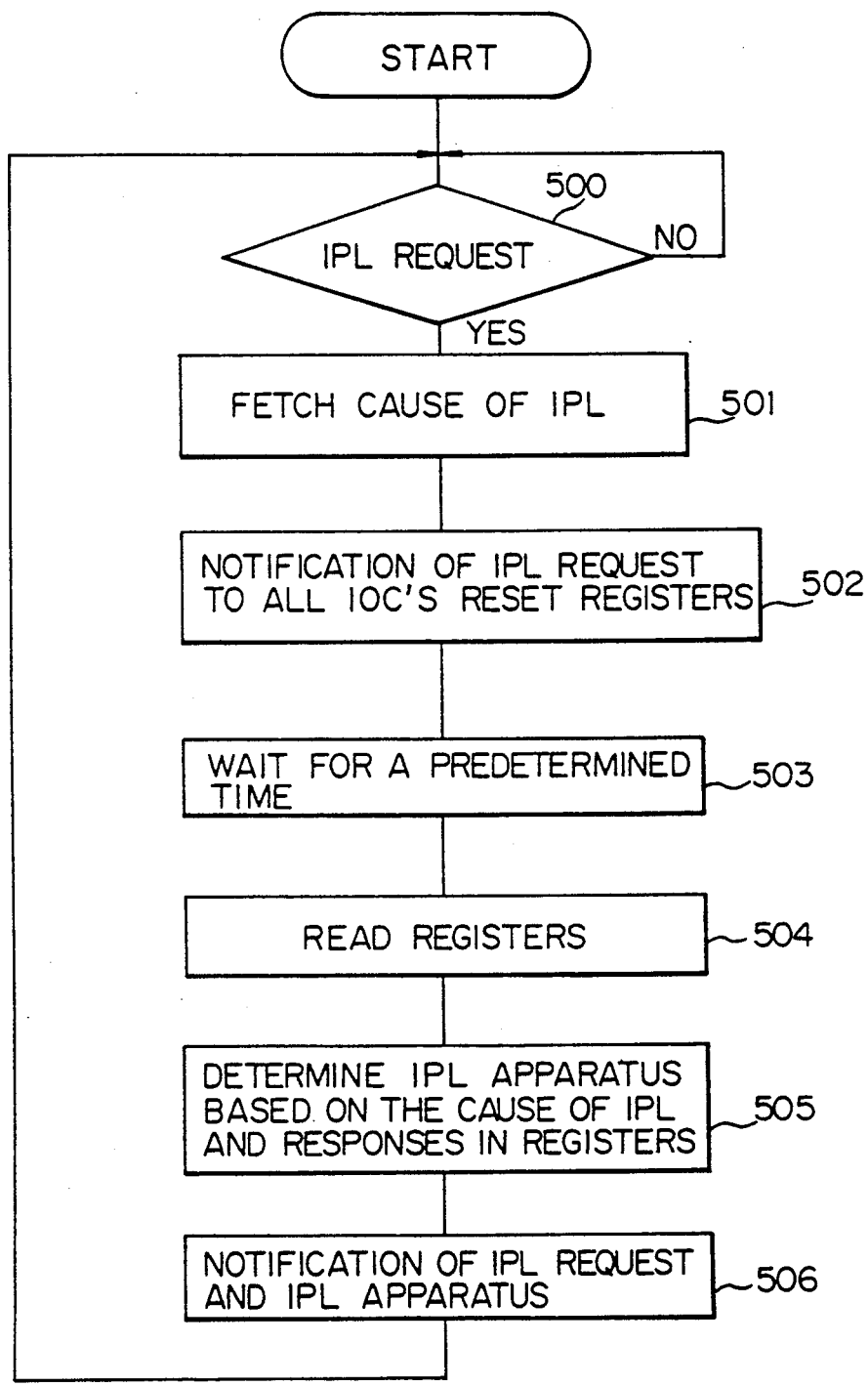
FIG. 22 is a flowchart of an example operation of the construction of FIG. 21.
Figure 23:
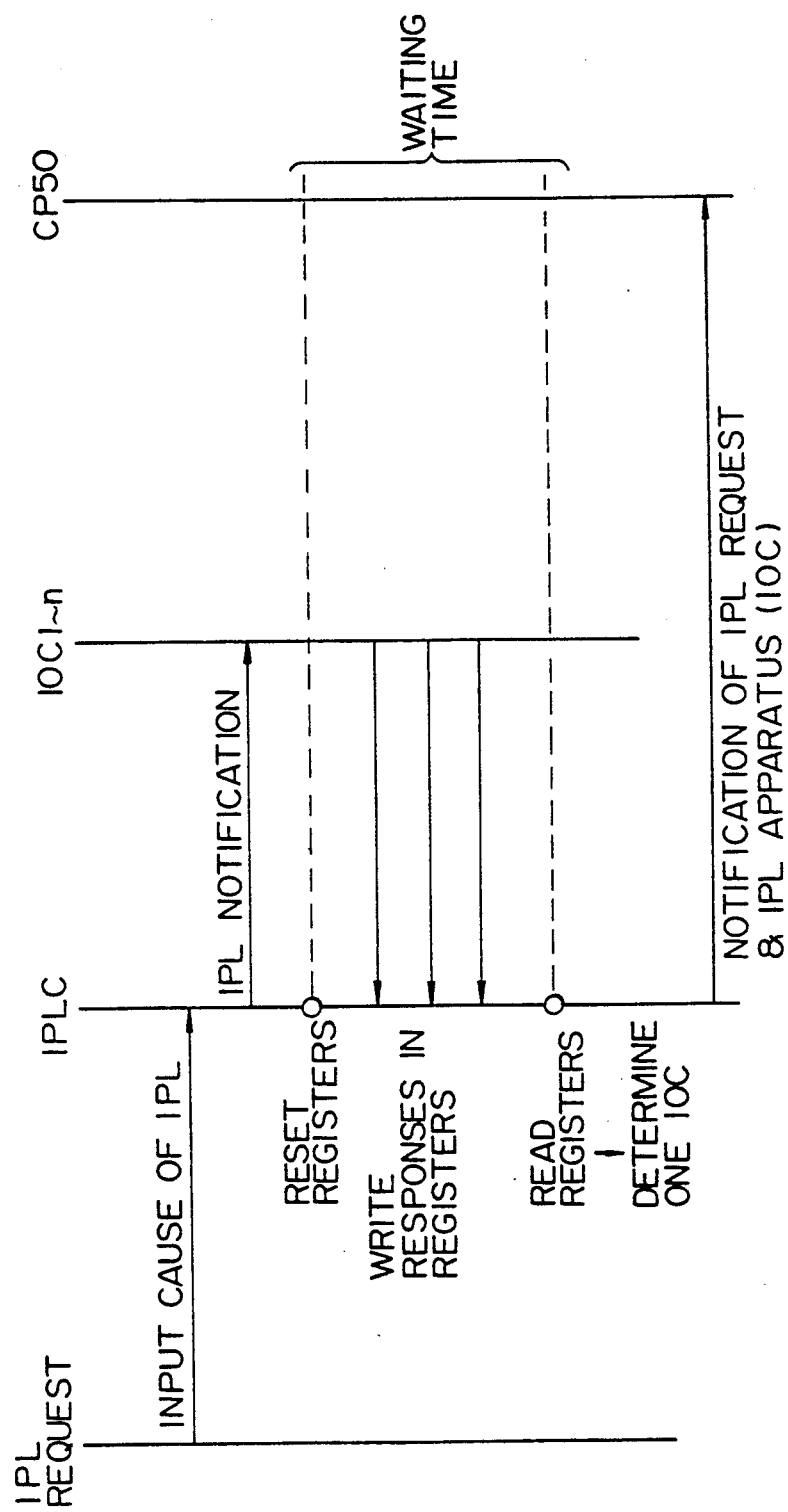
FIG. 23 is an example sequence of the operation of the construction of FIG. 21.

FIG. 22 is a flowchart of an example operation of the construction of FIG. 21. In the step 500, it is determined whether or not an IPL request is received at the I/O port 96. When yes is determined in the step 500, the cause of the IPL request is received through the I/O port 96 in the step 501. In this example, the I/O port 96 is connected through a plurality of signal lines with a plurality of inputs for IPL requests of various causes, for example, an IPL request after a power-ON operation, an IPL request by a remote control, an IPL request by a manual operation of the operation panel (not shown), or an IPL request by a manual input at each central processing unit (not shown). Therefore, the central processor 94 can recognize the cause of each IPL request by determining which signal line the IPL request is received through. Then, in the step 502, the central processor 94 notifies the reception of the IPL request to all the I/O controllers 59, 60, . . . and 63 which are connected to the central processing unit 50. That is, the central processor 94 sends the above-mentioned first notification signal to all the I/O controllers 59, 60, . . . and 63. At the same time, the central processor 94 clears the contents of the input registers 90, 91, . . . and 92. Next, the central processor 503 waits for a predetermined time to allow the I/O controllers to respond to the first notification signal. The response(s) (the above-mentioned second notification signal) from the I/O controller(s) are applied to the input registers 90, 91, . . . and 92, and the central processor 94 latches the response(s) in the input registers 90, 91, . . . and 92 after waiting for the above predetermined time, in the step 504. For example, "1" is latched in the corresponding input register when a positive response (a second notification signal which notifies that the corresponding I/O device is prepared to transfer a bootstrap loader) is sent from the I/O controller. Then, in the step 505, the central processor 94 determines an I/O device from which the bootstrap loader is to be transferred to the main memory in the central processing unit 50. The priority order of the I/O devices to be determined as above may be memorized in advance in the main memory 95 in the IPL control circuit 55 for each of the above-mentioned plurality of causes of the IPL requests. For example, the priority order may be:

for an IPL request due to the above-mentioned manual input at each central processing unit, a magnetic disc device is the first, a magnetic tape device is the second, and a channel-to-channel adapter is the third;

for an IPL request due to the above-mentioned power-ON or the above-mentioned IPL request by the remote control, the channel-to-channel adapter is the first, the magnetic disc device is the second, and the magnetic tape device is the third; and the like. Then, the above reception of the IPL request and the above determined I/O device are notified to the central processing unit 50 through the I/O port 97 (the above-mentioned third notification). An example sequence of the above operation of FIG. 22 is shown in FIG. 23.

Although the above operation corresponds to the aforementioned fifth embodiment of the present invention, it will be readily understood that the aforementioned fourth and sixth embodiments can be realized by the hardware construction of FIGS. 18 and 20 in accordance with the sequences as explained with reference to FIGS. 10, 11, 14, and 15.

Figure 24:
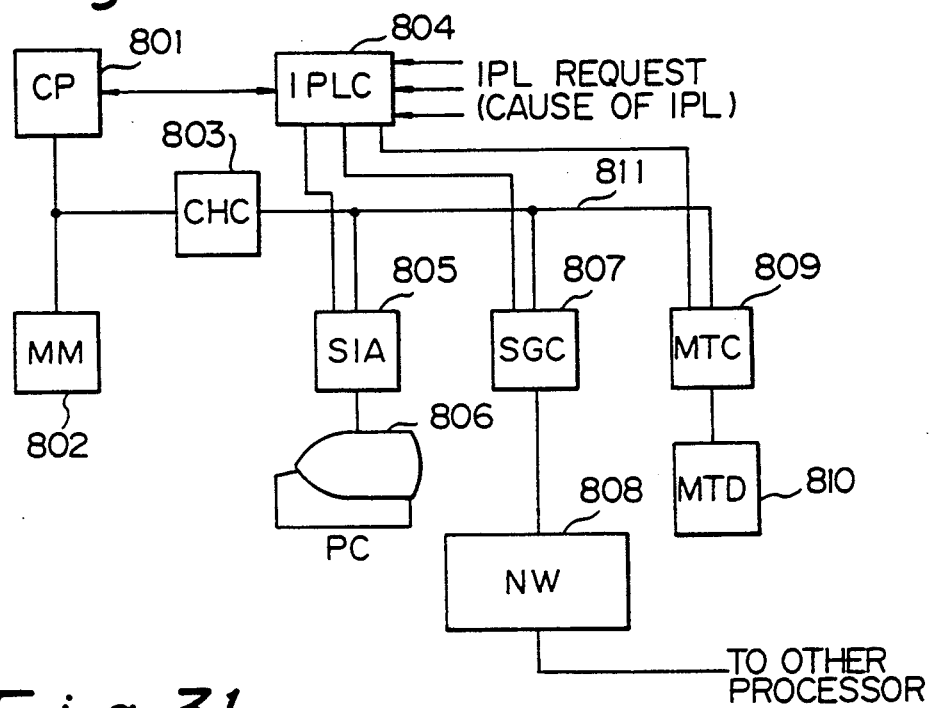
FIG. 24 is a block diagram showing an example configuration of the second embodiment of the present invention.

FIG. 24 is a block diagram showing an example configuration of the second embodiment of the present invention. In FIG. 24, reference numeral 801 denotes a central processor, 802 denotes a main memory, and 803 denotes a channel controller. 804 denotes an IPL control circuit, 805 denotes a serial interface adapter SIA, and 806 denotes a personal computer. 807 denotes a signal controller SGC, and 808 denotes a communication network. 809 denotes a magnetic tape device controller, and 810 denotes a magnetic tape device. 811 denotes a channel bus. The serial interface adapter SIA 804 is an interface circuit between the personal computer 806 and the channel controller 803, and the signal controller SGC 807 is an interface circuit between the communication network 807 and the channel controller 803. In the construction of FIG. 24, each of the serial interface adapter SIA 804, the signal controller SGC 807, and the magnetic tape device controller 809 contains the above-mentioned construction and functions of the I/O controller of FIG. 19.

Namely, when an IPL request is received in the central processor 801 through the IPL control circuit 804, a microprogram for an initial program loading starts in the central processor 801. First, a clear order is supplied to the channel controller 803 to output a reset signal on the channel bus 811. Receiving the reset signal, the serial interface adapter SIA 804 determines whether or not the above-mentioned conditions (a) and (b) are satisfied in the personal computer 806, and sends an interrupt signal to the IPL control circuit 804 when the conditions are determined to be satisfied. The interrupt signal indicates that the satisfaction of the conditions in the personal computer 806. Receiving the above reset signal, the signal controller SGC 807 returns an interrupt signal to the IPL control circuit 804 after waiting for a first predetermined time. Receiving the reset signal, the magnetic tape device controller 809 determines whether or not the above-mentioned conditions (a) and (b) are satisfied in the magnetic tape device 810, and sends an interrupt signal to the IPL control circuit 804 immediately when the conditions are determined to be satisfied, where the interrupt signal indicates that the satisfaction of the conditions in the magnetic tape device 810. Thereafter, the construction of FIG. 24 operates as explained with reference to FIG. I9. The above signal controller SGC 807 is an interface circuit between the communication network 808 and the channel controller 803, and transfer of program data is carried out from another processor to the central processor 801 in a way similar to the first embodiment.

(4) Third Embodiment

Figure 25:
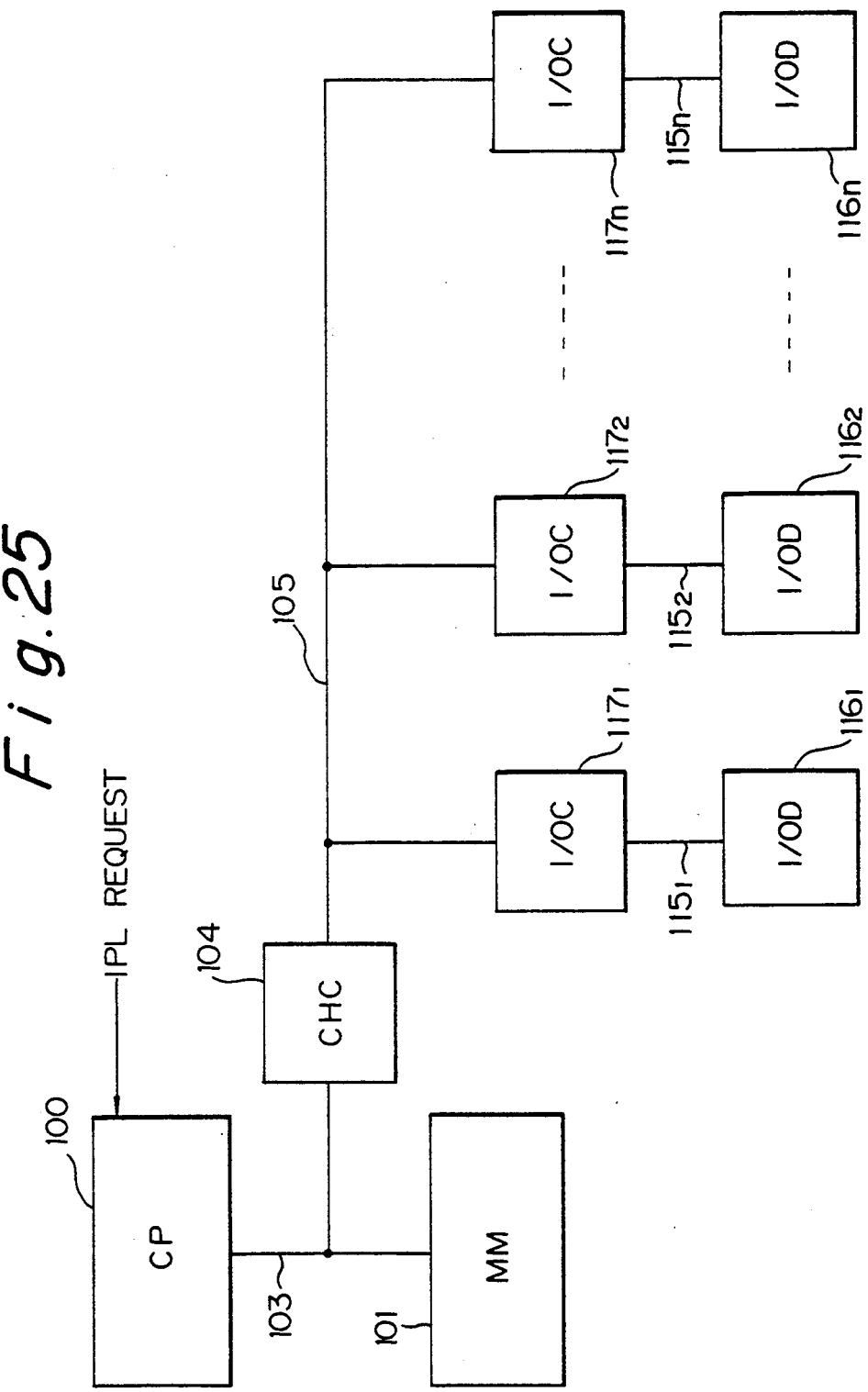
FIG. 25 is a block diagram showing a hardware configuration of the third embodiment of the present invention.

The third embodiment corresponds to the aforementioned third aspect of the present invention. FIG. 25 is a block diagram showing a hardware configuration of the third embodiment of the present invention. In FIG. 25, reference numerals $116_1$, $116_2$, ... $116_n$ each denote an I/O device, $117_1$, $117_2$, ... $117_n$ each denote an I/O controller, and 118 denotes a central processor the I/O devices $116_1$, $116_2$, ... $116_n$ are respectively connected to the corresponding I/O controllers $117_1$, $117_2$, ... $117_n$. The I/O controllers $117_1$, $117_2$, ... $117_n$ are connected to the channel controller 104 through the channel bus 105. In the construction of the third embodiment, the IPL control circuit is not provided therein, and the function of the IPL control circuit in the second embodiment is realized in the central processing unit.

Figure 26:
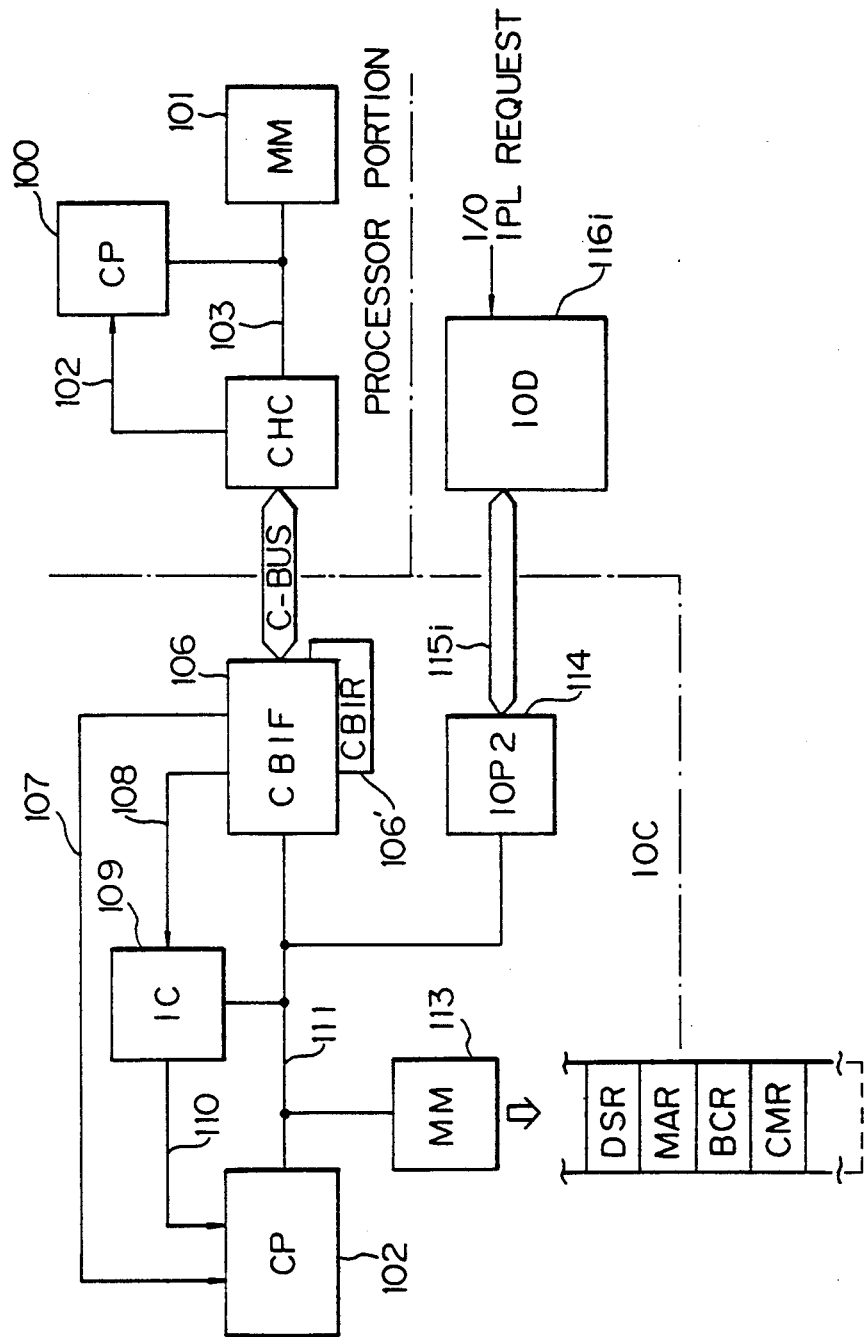
FIG. 26 is a block diagram showing a construction of the second embodiment of the present invention.

FIG. 26 is a block diagram showing an example construction of the I/O controller $117_i$ (i=1,2, ... or n) in FIG. 25. The difference of the construction of the I/O controller shown in FIG. 26 from the construction of the I/O controller in FIG. 19, is that the I/O controller of FIG. 25 does not contain the construction for communicating with the IPL control circuit. In FIG. 26, reference numeral 106 denotes a channel bus interface circuit, and 106' denotes a channel bus interface register. 112 denotes a central processor, 108 denotes an interrupt signal line, 111 denotes an internal system bus, and 113 denotes a main memory. 109 denotes an interrupt control circuit, 107 denotes a signal line for the first notification signal, and 106 denotes a channel bus interface circuit. 114 denotes an I/O port for communicating with the I/O device $116_i$, 105 denotes a channel bus, and $115_i$ (i=1,2, ... or n) denotes a signal line between the I/O controller $117_i$ and the I/O device $116_i$ (i=1,2, ... or n). The central processor 112 controls the operations of the I/O controller $117_i$. The channel bus interface circuit 106 includes the channel bus interface register 106'. The channel bus interface circuit 106 is an interface circuit for communicating with the channel controller 104. The main memory 113 includes: a device status register DSR, a memory address register MAR, a byte count register, a command register CMR, and a channel bus interface register CBIR.

The operation of the construction shown in FIGS. 24 and 25 for loading a bootstrap loader is as follows.

When an IPL request is input in the central processor 100, execution of a microprogram starts, and a notification that the central processor 100 is in an IPL state is sent to the channel controller 104. The information on the cause of the IPL request is contained in the notification. Receiving the notification, the channel controller 104 outputs an active (low level) reset signal onto a control line of the channel bus 105, and a predetermined pattern which shows the above cause of the IPL request, on data lines of the channel bus 105. When receiving the active reset signal, the channel bus interface circuit 106 sends a reset signal to the central processor 112 in the I/O controller $117_i$. In addition, the channel bus interface circuit 106 latches the above predetermined pattern in the channel bus interface register 106' when the above reset signal on the control line of the channel bus becomes inactive (returns to a high level state). The reset signal on the control line returns to a high level state when the above pattern on the control line of the channel bus is stable.

Figure 27:
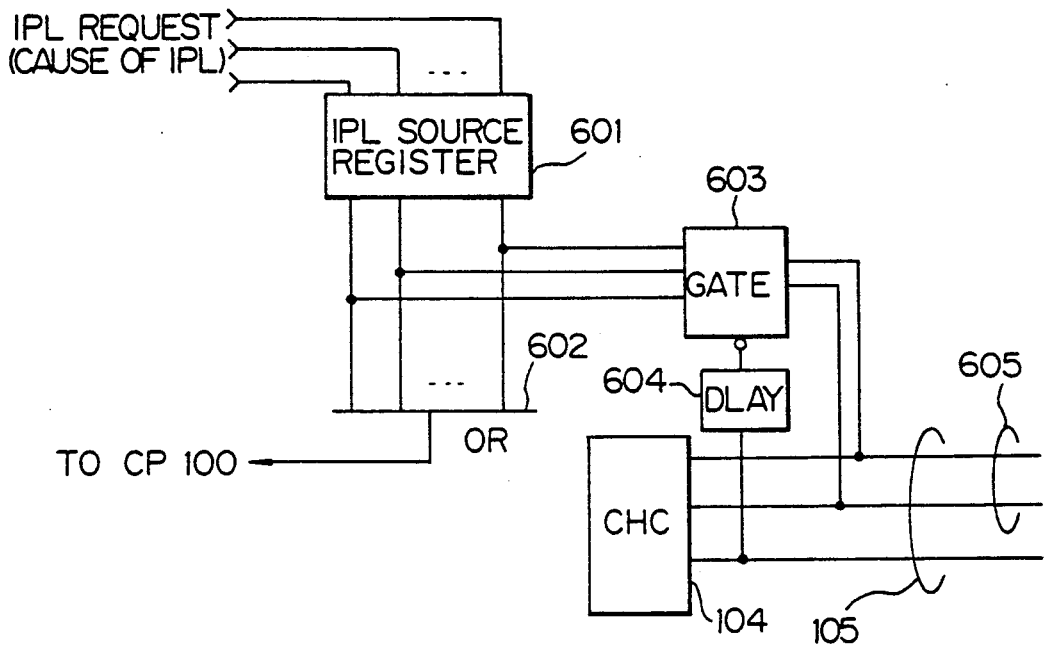
FIG. 27 shows an example construction which is provided around the central processor 100 and the channel controller 104 for outputting the above pattern on the channel bus 105.

FIG. 27 shows an example construction which is provided around the central processor 100 and the channel controller 104 for outputting the above pattern on the channel bus 105. In FIG. 26, reference numeral 601 denotes an IPL source register, and 602 denotes an OR circuit. 603 denotes a tristate buffer gate, 604 denotes a delay circuit, 605 denotes data lines of the channel bus 105. The cause of the IPL request is first latched in the IPL source register which is comprised of a plurality of flip-flop circuits. The outputs of the plurality of flip-flop circuits are input into the OR circuit 602, and the output of the OR circuit 602 is sent to the central processor as an IPL signal. Responding to the IPL signal, the central processor 100 outputs the above reset signal on the channel bus 105 through the channel controller 104. A gate control signal is generated by delaying the above reset signal in the delay circuit 604, and the gate control signal is applied to the tristate buffer gate 603. When the gate control signal is active, the outputs of the plurality of flip-flop circuits of the IPL source register 601 are output on the data lines of the channel bus 105 through the tristate buffer gate 603.

Figure 28:
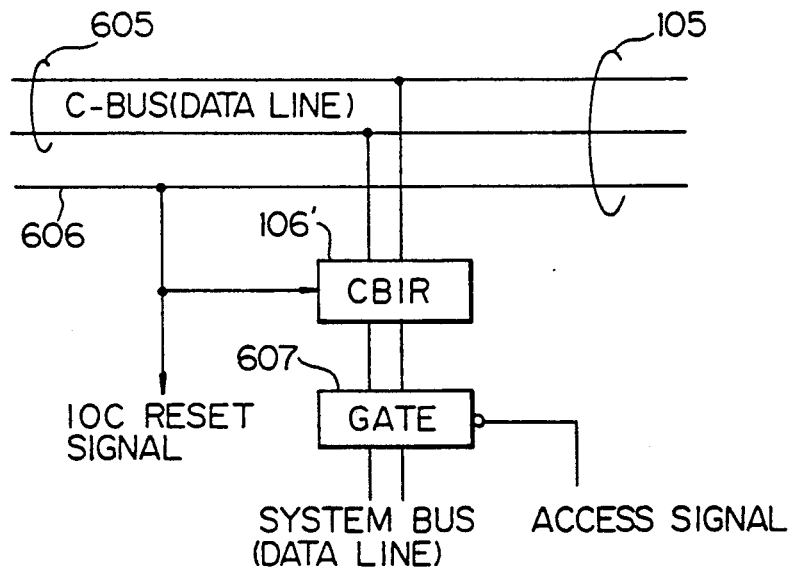
FIG. 28 shows an example construction in the channel bus interface circuit 106 for receiving the above pattern from the channel bus 105.

FIG. 28 shows an example construction in the channel bus interface circuit 106 for receiving the above pattern from the channel bus 105. In FIG. 28, reference numeral 607 denotes a tristate buffer gate, 606 denotes a control line of the channel bus 105, and the other reference numerals each denote the same elements as FIGS. 24 and 25. The reset signal which is transferred through the control line 606 is applied to the channel bus interface register 106' as a latch control signal. The reset signal is supplied in parallel to the central processor 112 of the I/O controller 117ᵢ to reset the central processor 112 and start the microprogram in the I/O controller 117ᵢ. The above pattern is latched in the channel bus interface register 106' when the active reset signal is applied thereto, and the pattern is output from the channel bus interface register 106' and is supplied to the central processor 112 through the tristate buffer gate 607 when an access signal is applied from the central processor 112 to the tristate buffer gate 607 to read the pattern.

An example of the pattern which is latched in the channel bus interface register 106' when the above provision is applied to the construction of the digital exchange system of FIG. 1, is shown in FIG. 29. In the example of FIG. 29, the pattern includes five effective bits comprised of: PWR, RMT, OCNS, BCNS, and IOC, where the PWR bit indicates that the IPL operation is requested due to a power-on-reset operation, the RMT bit indicates that the IPL operation is requested by a remote control, the OCNS bit indicates that the IPL operation is requested by a manual operation on a central operation panel (not shown), the BCNS bit indicates that the IPL operation is requested by a manual operation on a basic operation panel (not shown) which is provided in each processor of FIG. 1, and the IOC bit indicates that the IPL operation is requested from another I/O device (for example, a keyboard). The I/O controller which is provided for the above other I/O device also has a construction similar to the construction of FIG. 26, and an input for the IPL request is shown in FIG. 26 by "I/O IPL REQUEST". The I/O IPL REQUEST input from the above other I/O device can be transferred to the central processor 112 in the above corresponding I/O controller through the I/O port 114 in the I/O controller, and the IPL request is transferred from the central processor 112 in the I/O controller to the central processor 100 which is to be subject to the IPL operation. The above central operation panel is connected to the management processor 1 of FIG. 1, and the IPL request which is input from the central operation panel is transferred from the management processor 1 to one of the processors in the construction of FIG. 1. Although not shown, generally, the above IPL request by the remote control can be transferred to a processor which is to be subject to the IPL operation for example, through any transmission line. The above basic operation panel is provided for each processor in the construction of FIG. 1.

Returning to FIG. 26, when the above pattern is latched in the channel bus interface register 106', the central processor 112 reads the pattern from the channel bus interface register 106', and recognizes that the central processor 100 is ready for initial program loading. The central processor 112 determines whether or not the I/O device corresponding to the I/O controllers is in a state satisfying the aforementioned two conditions as follows:

(a) the bootstrap loader is installed in the I/O device; and (b) the I/O device is connected to the I/O controller through the I/O port 114, and is able to transfer the bootstrap loader to the central processor 100.

When it is determined that the above conditions are satisfied, the central processor 112 waits for a predetermined time. The waiting time is memorized in the main memory 113 in advance. After waiting for the predetermined time, the central processor 112 writes data including a result of the above determination in the device status register DSR in the main memory 113, and sends an interrupt signal through the channel bus interface circuit 106 to the channel controller 104.

FIG. 30 shows an example content of the device status register DSR for the digital exchange system of FIG. 1. The device status register DSR is comprised of 16 bits. Each bit of the device status register DSR indicates the status of the I/O controller and the corresponding I/O device, for example, a BUSY state, an operator call OPC, a time-out state TMO, a complete CMP, a data error DER, and an indication of the satisfaction of the above conditions IPLR.

Receiving the above interrupt signal, the channel controller 104 reads the content of the device status register DSR through the channel bus 105 and the channel bus interface circuit 106, writes the content in the main memory 101 with information for identifying the I/O controller, and sends an interrupt signal to the central processor 100. Receiving the interrupt signal, the central processor 100 reads the above information from the main memory 101 to determine the I/O device corresponding to the above I/O controller, as an I/O device from which a bootstrap loader is to be supplied to its own main memory 101. Thereafter, a transfer of the bootstrap loader is carried out in a way similar to the second embodiment.

Figure 31:
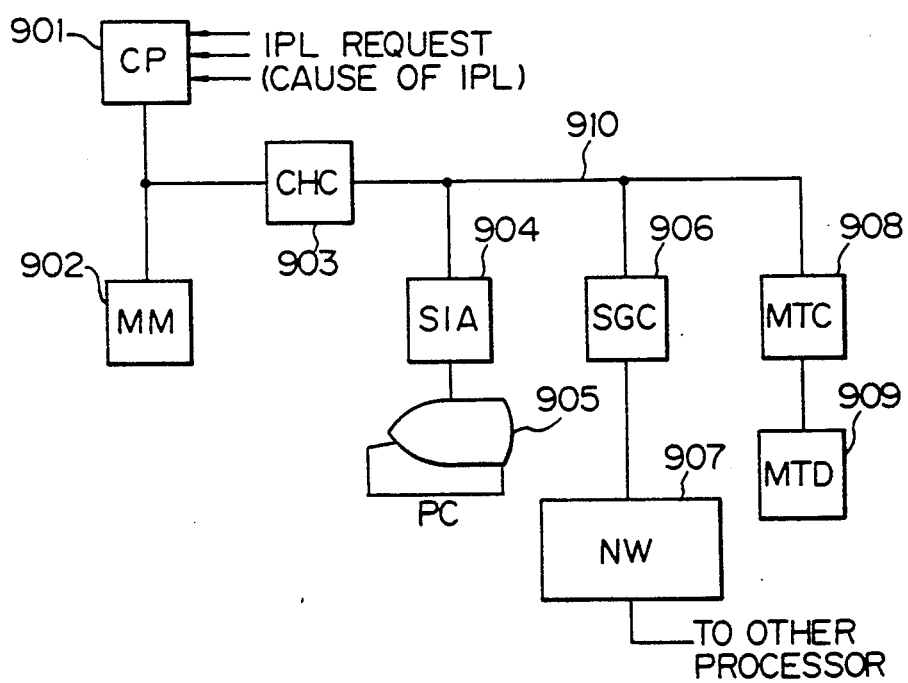
FIG. 31 is a block diagram showing an example configuration of the third embodiment of the present invention.

FIG. 31 is a block diagram showing an example configuration of the third embodiment of the present invention. In FIG. 31, reference numeral 901 denotes a central processor, 902 denotes a main memory, 903 denotes a channel controller, 904 denotes a serial interface adapter SIA, 905 denotes a personal computer, 906 denotes a signal controller SGC, 907 denotes a communication network, 908 denotes a magnetic tape device controller, 909 denotes a magnetic tape device, and 910 denotes a channel bus. The serial interface adapter SIA 904 is an interface circuit between the personal computer 905 and the channel controller 903, and the signal controller SGC 906 is an interface circuit between the communication network 907 and the channel controller 903. In the construction of FIG. 31, each of the serial interface adapter SIA 904, the signal controller SGC 907, and the magnetic tape device controller 908 contains the above-mentioned construction and functions of the I/O controller of FIG. 26.

When an IPL request is received in the central processor 901, a microprogram for an initial program loading starts in the central processor 901, and first, a clear order is supplied to the channel controller 903 to output a reset signal on the channel bus 911. Receiving the reset signal, the serial interface adapter SIA 904, the signal controller SGC 907, and the magnetic tape device controller 909 respectively operates in similar ways to the corresponding elements in the construction of FIG. 24. Thereafter, the construction of FIG. 31 operates as explained with reference to FIG. 26.

What is claimed is:

1. An initial program loading (IPL) system for performing an initial program load operation in an information processing system, said IPL system comprising:
   a plurality of peripheral apparatuses, each peripheral apparatus capable of transferring and loading program data in response to an IPL request input into said IPL system, and comprising:
     IPL request receiving means for receiving said IPL request,
     program transfer ready state notifying means for sending a notification that the peripheral apparatus holds the program data to be transferred and is ready to transfer the program data, and
     program data transfer means for transferring the program data; and
   a central processing unit connected to each of said peripheral apparatuses, receiving the notification and the program data from one of sad peripheral apparatuses, and comprising:
     a memory unit,
     notification receiving means for receiving said notification from said program transfer ready state notifying means of the one of said peripheral apparatuses, informing said central processing unit that said one of the peripheral apparatuses is ready to transfer the program data, and
     program data receiving means for receiving the program data transferred from said program data transfer means of said one of the peripheral apparatuses to be loaded into the memory unit of said central processing unit for performing the initial program load operation.

2. An initial program loading system according to claim 1, wherein said one peripheral apparatus further comprises a program transfer ready state determining unit for receiving the IPL request from said IPL request receiving means, and for determining whether said one peripheral apparatus holds the program data to be transferred to the central processing unit responsive to said IPL request, and whether said one peripheral apparatus is ready to transfer the program data to the central processing unit when the IPL request tis received, and wherein said program transfer ready state notifying means sends the notification to the central processing unit when instructed by the program transfer ready state determining unit.

3. An initial program loading system according to claim 1, wherein said central processing unit further comprises transfer request sending means for sending a transfer request to the one of said peripheral apparatuses sending said notification when said notification is received by said notification receiving means, and when said notification receiving means informs said transfer request sending means that said notification has been received, wherein said program data receiving means receives the program data transferred from the one of said peripheral apparatuses to which said transfer request has been sent, wherein the one of sad peripheral apparatuses further comprises transfer request receiving means for receiving said transfer request and for informing said program data transfer means that said transfer request has been received, and wherein said program data transfer means transfers the program data to the central processing unit when said transfer request is received by said transfer request receiving means.

4. An initial program loading (IPL) system in an information processing system, for performing an initial program load operation, said IPL system comprising:
   a central processing unit comprising:
     a memory unit,
     IPL request receiving means for receiving an IPL request and for outputting a received notification,
     IPL ready state notifying means for receiving said received notification from said IPL request receiving means, for determining whether the central processing unit is ready to receive program data, and for sending a first notification indicating that the central processing unit is ready to receive the program data which is to be loaded in the central processing unit when said IPL request is received by said IPL request receiving means responsive to said received notification,
     IPL apparatus notification receiving means for receiving a second notification, and
     program data receiving means for receiving the program data to be loaded into the memory unit of said central processing unit for performing the initial program load operation; and
   a plurality of peripheral apparatuses having a first peripheral apparatus and connected to said central processing unit to transfer program data from the first peripheral apparatus of the plurality of peripheral apparatuses to the central processing unit, wherein at least the first peripheral apparatus of the plurality of peripheral apparatuses comprises:
     IPL ready notification receiving means for receiving sad first notification from said IPL ready state notifying means, and for outputting a first received notification,
     program transfer ready state determining means for receiving said first received notification from said IPL ready notification receiving means, for determining whether the first peripheral apparatus holds the program data to be transferred to the central processing unit, and is ready to transfer the program data to said central processing unit, when said first notification is received by said IPL ready notification receiving means responsive to said first received notification and for outputting a ready notification,
     program transfer ready state notifying means for receiving said ready notification from said program transfer ready state determining means, for sending to said IPL apparatus notification receiving means in the central processing unit the second notification when determined in said program transfer ready state determining means responsive to said ready notification and for outputting a transfer notification, and program data transfer means for receiving said transfer notification from said program transfer ready state notifying means, and for transferring the program data to said central processing unit when it is determined that said first peripheral apparatus holds the program data to be transferred to the central processing unit, and is ready to transfer the program data to said central processing unit, in said program transfer ready state determining means responsive to said transfer notification.

5. An initial program loading system according to claim 4, wherein said plurality of peripheral apparatuses further includes a second peripheral apparatus connected to said central processing unit, wherein said IPL apparatus notification receiving means outputs a peripheral notification, and wherein said central processing unit further comprises IPL apparatus determining means for receiving said peripheral notification from said IPL apparatus notification receiving means, and for determining whether said program data to be transferred to the central processing unit is from one of said first peripheral apparatus and said second peripheral apparatus responsive to said peripheral notification.

6. An initial program loading system according to claim 5, wherein said central processing unit further comprises transfer request sending means for sending a transfer request for transferring the program data from the program data transfer means of aid first peripheral apparatus to the one of the first peripheral apparatus and the second peripheral apparatus determined by said IPL apparatus determining means, and said program data receiving means receives the program data which is transferred from said one of said first peripheral apparatus and said second peripheral apparatus to which said transfer request has been sent, wherein said one of said first peripheral apparatus and second peripheral apparatus further comprises transfer request receiving means for receiving said transfer request, and wherein said program data transfer means transfers the program data to the central processing unit when said transfer request is received from said transfer request sending means.

7. An initial program loading system according to claim 5, wherein said IPL apparatus determining means determines whether the program data to be transferred is from said one of said first peripheral apparatus and said second peripheral apparatus responsive to said peripheral notification which is first received from said IPL apparatus notification receiving means.

8. An initial program system according to claim 7, wherein said first peripheral apparatus comprises response delay means for delaying said sending of the second notification by said program transfer ready state notifying means for a predetermined time by sending said program transfer ready state notifying means a delay notification, where the predetermined time in the first peripheral apparatus is preset according to a predetermined priority order of the first peripheral apparatus regarding the supplying of the program data to the central processing unit.

9. An initial program loading system according to claim 5, wherein said central processing unit further comprises IPL cause information receiving means for receiving a cause of the IPL request when the IPL request is received in said IPL request receiving means and for outputting the cause, and said IPL apparatus determining means receives the cause from said IPL cause information receiving means and determines whether said program data to be transferred to the central processing unit is from said one of said first peripheral apparatus and said second peripheral apparatus, based on the cause.

10. An initial program loading system according to claim 9, wherein said central processing unit further comprises IPL priority memorizing means for memorizing a priority order of the plurality of peripheral apparatuses for a plurality of causes of IPL requests and for outputting said priority order, and said IPL apparatus determining means receives said priority order from said IPL priority memorizing means and determines whether said program data to be transferred to the central processing unit is from said one of said first peripheral apparatus and said second peripheral apparatus, based on the cause and the priority order memorized in the IPL priority memorizing means.

11. An initial program loading system in an information processing system for performing an initial program load operation, comprising:

a central processing unit;

peripheral apparatuses, connected to the central processing unit; and an IPL controller, connected to said central processing unit and said peripheral apparatuses, and instructing one of the peripheral apparatuses to transfer program data to the central processing unit for performing the initial program load operation in response to an IPL request which is input into said initial program loading system, said IPL controller comprising:

IPL request receiving means for receiving said IPL request and outputting a request message, IPL request notifying means for receiving said request message from said IPL request receiving means and for sending an IPL request notification responsive to said request message notifying reception of said IPL request, to said central processing unit and said one of said peripheral apparatuses when said IPL request is received in said IPL request receiving means, IPL apparatus determining means for receiving a transfer ready notification from said one of said peripheral apparatuses, and for determining whether the program data to be transferred to said central processing unit is from said one of said peripheral apparatuses, where the transfer ready notification notifies said IPL apparatus determining means that the one of the peripheral apparatuses holds the program data which is to be transferred to the central processing unit, and is ready to transfer the program data to the central processing unit, and IPL apparatus notifying means for sending an IPL apparatus notification to said central processing unit, where the IPL apparatus notification notifies the central processing unit of the one of the peripheral apparatuses which is determined by said IPL apparatus determining means;

said central processing unit comprising:

a memory unit,
first IPL request notification receiving means for receiving said IPL request notification from said IPL request notifying means and for outputting a notification message,
IPL ready determining means for receiving said notification message from said first IPL request notification receiving means, and for determining whether the central processing unit is ready to receive the program data to be loaded in the central processing unit responsive to said notification message,
IPL apparatus notification receiving means for receiving said IPL apparatus notification from said IPL apparatus notifying means, and for outputting an apparatus message, and
program data receiving means for receiving said apparatus message from said IPL apparatus notification receiving means, and for receiving the program data which is transferred from said one of said peripheral apparatuses notified by the IPL apparatus notification, when said IPL ready determining means determines that the central processing unit is ready to receive the program data responsive to said apparatus message; and
said peripheral apparatuses each comprising:
second IPL request notification receiving means for receiving said IPL request notification from said IPL request notifying means and for outputting a request indicator,
program transfer ready state determining means for receiving said request indicator from said second IPL request notification receiving means, for determining whether the one of said peripheral apparatuses holds the program data to be transferred to the central processing unit, and is ready to transfer the program data to the memory unit of the central processing unit, when said IPL request notification is received responsive to said request indicator and for outputting a ready message,
program transfer ready state notifying means for receiving said ready message from said program transfer ready state determining means, for sending to the IPL controller the transfer ready notification which notifies the IPL controller that the one of said peripheral apparatuses holds the program data to be transferred to the central processing unit, and is ready to transfer the program data to the central processing unit, when determined in said program transfer ready state determining means responsive to said ready message and for outputting a transfer message, and
program data transfer means for receiving said transfer message from said program transfer ready state notifying means, and for transferring the program data to the central processing unit after said transfer ready notification is sent by the program transfer ready state notifying means responsive to said transfer message.

12. An initial program loading system according to claim 11, wherein said central processing unit further comprises transfer request sending means for receiving said apparatus message from said IPL apparatus notification receiving means instead of said program data receiving means, and for sending a transfer request for transferring the program data to said central processing unit from said one of the peripheral apparatuses notified by said IPL apparatus notification responsive to said apparatus message,
said program data receiving means receives the program data transferred from said one of said peripheral apparatuses to which said transfer request has been sent,
said one of said peripheral apparatuses further comprises transfer request receiving means for receiving said transfer request from said transfer request sending means, and
said program data transfer means transfers the program data to the central processing unit when said transfer request is received.

13. An initial program loading system according to claim 11, wherein said IPL apparatus determining means determines whether the program data to be transferred to said central processing unit is from said one of said peripheral apparatuses when said IPL apparatus determining means receives said transfer ready notification first from said one of said peripheral apparatuses.

14. An initial program loading system according to claim 13, wherein each of said peripheral apparatuses further comprises response delay means for delaying said sending of the transfer ready notification by said program transfer ready state notifying means for a predetermined time by sending said program transfer ready state notifying means a delay notification, where the predetermined time in the peripheral apparatuses is preset according to predetermined priority orders of the peripheral apparatuses regarding the supplying of the program data to the central processing unit.

15. An initial program loading system according to claim 11, wherein said IPL controller further comprises IPL cause information receiving means for receiving a cause of the IPL request when the IPL request is received in said IPL request receiving means and for outputting the cause, and
wherein said IPL apparatus determining means receives the cause from said IPL cause information receiving means and determines whether said program data to be transferred to the central processing unit is from said one of said peripheral apparatuses, based on the cause.

16. An initial program loading system according to claim 15, wherein said IPL controller further comprises IPL priority memorizing means for memorizing priority orders of said peripheral apparatuses for a plurality of causes of IPL requests and for outputting said priority orders, and said IPL apparatus determining means receives said priority orders from said IPL priority memorizing means and determines whether said program data to be transferred to the central processing unit is from said one of said peripheral apparatuses, based on the cause and the priority orders memorized in the IPL priority memorizing means.

17. An initial program loading system in an information processing system for performing an initial program load operation, comprising:
a central processing unit;
peripheral apparatuses connected to said central processing unit;
an IPL controller, connected to said central processing unit and said peripheral apparatuses, and instructing one of the peripheral apparatuses to transfer program data to the central processing unit for performing the initial program load operation in response to an IPL request which is input into said initial program loading system, said IPL controller comprising;

IPL request receiving means for receiving said IPL request and for outputting a request message, IPL request notifying means for receiving said request message from said IPL request receiving means and for sending an IPL request notification responsive to said request message notifying reception of said IPL request, to said one of said peripheral apparatuses when said IPL request is received in said IPL request receiving means, IPL apparatus determining means for receiving a transfer ready notification from said one of the peripheral apparatuses, and for determining whether the program data to be transferred to said central processing unit is from said one of said peripheral apparatuses, where the transfer ready notification notifies said IPL controller that the one of the peripheral apparatuses holds the program data to be transferred to the central processing unit, and is ready to transfer the program data to the central processing unit, and for outputting a ready message, and IPL request and apparatus notifying means for receiving said ready message from said IPL apparatus determining means, and for sending an IPL request and apparatus notification to said central processing unit, when the IPL request and apparatus notification notifies the reception of said IPL request and said one of said peripheral apparatuses which is determined in said IPL apparatus determining means responsive to said ready message;

said central processing unit comprising:
a memory unit,

IPL request and apparatus notification receiving means for receiving said IPL requests and apparatus notification from said IPL request and apparatus notifying means, and for outputting a notice message, and program data receiving means for receiving said notice message from said IPL request and apparatus notification receiving means, and for receiving the program data which is transferred from said one of the peripheral apparatuses notified by the IPL request and apparatus notification responsive to said notice message; and said one of said peripheral apparatuses comprising:

IPL request notification receiving means for receiving said IPL request notification from said IPL request notifying means and for outputting a request message, program transfer ready state determining means for determining whether the one of the peripheral apparatuses holds the program data to be transferred to the central processing unit, and is ready to transfer the program data to the central processing unit, when said IPL request notification is received and for outputting a request indicator, program transfer ready state notifying means for receiving said request indicator from said program transfer ready state determining means, for sending, responsive to the request indicator, to the IPL apparatus determining means in the IPL controller the transfer ready notification which notifies the IPL controller that the one of the peripheral apparatuses holds the program data which is to be transferred to the central processing unit, and is ready to transfer the program data to the central processing unit, when determined in said program transfer ready state determining means, and for outputting a ready message, and program data transfer means for receiving said ready message from said program transfer ready state notifying means, and for transferring the program data to the memory unit of the central processing unit after said transfer ready notification is sent by the program transfer ready state notifying means responsive to said ready message.

18. An initial program loading system according to claim 17, wherein said central processing unit further comprises transfer request sending means for receiving said notice message from said IPL request and apparatus notification receiving means instead of said program data receiving means, and for sending a transfer request for transferring the program data to said central processing unit from said one of the peripheral apparatuses notified by said IPL request and apparatus notification when the IPL request and apparatus notification is received in said IPL request and apparatus notification receiving means, and said program data receiving means receives the program data which is transferred from said one of said peripheral apparatuses to which said transfer request has been sent responsive to said notice message;

said one of aid peripheral apparatuses further comprises transfer request receiving means for receiving said transfer request from said transfer request sending means; and said program data transfer means transfers the program data to the central processing unit when said transfer request is received.

19. An initial program loading system according to claim 17, wherein said IPL apparatus determining means determines whether the program data is to be transferred to said central processing unit is from said one of said peripheral apparatuses when said IPL apparatus determining means receives said transfer ready notification first from said one of said peripheral apparatuses.

20. An initial program loading system according to claim 19, wherein each of said peripheral apparatuses further comprises response delay means for delaying said sending of the transfer ready notification by said program transfer ready state determining means for a predetermined time by sending said program transfer ready state determining means a delay notification, where the predetermined time is preset according to predetermined priority orders of the peripheral apparatuses regarding the supplying of the program data to the central processing unit.

21. An initial program loading system according to claim 17, wherein said IPL controller further comprises IPL cause information receiving means for receiving a cause of the IPL request when the IPL request is received in said IPL request receiving means and for outputting the cause, and wherein said IPL apparatus determining means receives the cause from said IPL cause information receiving means and determines whether said program data is to be transferred to the central processing unit is from said one of said peripheral apparatuses, based on the cause.

22. An initial program loading system according to claim 21, wherein said IPL controller further comprises IPL priority memorizing means for memorizing priority orders of the peripheral apparatuses for a plurality of causes of IPL requests and for outputting said priority orders, and said IPL apparatus determining means receives said priority orders from said IPL priority memorizing means and determines whether said program data to be transferred to the central processing unit is from said one of said peripheral apparatuses which sent said transfer ready notification, based on the cause and the priority orders memorized in the IPL priority memorizing means.

23. An initial program loading system according to claim 21, wherein said central processing unit further comprises IPL ready state determining means for receiving the IPL request and apparatus notification from said IPL request and apparatus notifying means, for determining whether the central processing unit is ready to receive the program data before carrying out said transfer of the program data responsive to said IPL request and apparatus notification, and for outputting a ready notice to said IPL controller indicating whether said central processing unit is ready to receive said program data.

24. An initial program loading system in an information processing system for performing an initial program load operation, comprising:

a central processing unit;

peripheral apparatuses connected to said central processing unit;

an IPL controller, connected to said central processing unit and said peripheral apparatuses, and instructing one of the peripheral apparatuses to transfer program data to the central processing unit for performing the initial program load operation in response to an IPL request which is input into said initial program loading system, said IPL controller comprising;

IPL request receiving means for receiving said IPL request and for outputting a request message, IPL request notifying means for receiving said request message from said IPL request receiving means, and for sending an IPL request notification responsive to said request message notifying reception of aid IPL request, to said central processing unit when said IPL request is received in said IPL request receiving means, IPL ready notification receiving means for receiving an IPL ready notification from said central processing unit and for outputting a ready message, IPL ready state notifying means for receiving said ready message from said IPL ready notification receiving means, for sending an IPL ready notification to said one of the peripheral apparatuses responsive to said ready message, IPL apparatus determining means for receiving a transfer ready notification from said one of the peripheral apparatuses, and for determining whether the program data to be transferred to said central processing unit is from said one of said peripheral apparatuses, where the transfer ready notification notifies said IPL apparatus determining means that the one of said peripheral apparatuses holds the program data which is t be transferred to the central processing unit, and is ready to transfer the program data to the central processing unit, and for outputting a transfer message, and IPL apparatus notifying means for receiving said transfer message from said IPL apparatus determining means, and for sending an IPL apparatus notification to said central processing unit, when the IPL apparatus notification notifies said central processing unit of the one of said peripheral apparatuses which is determined in said IPL apparatus determining means responsive to said transfer message;

said central processing unit comprising:

a memory unit,

IPL request notification receiving means for receiving said IPL request notification from said IPL request notifying means and for outputting a request message, IPL ready state determining means for receiving said request message from said IPL request notification receiving means, for determining whether the central processing unit is ready to receive the program data, and for sending said IPL ready notification to said IPL ready notification receiving means in said IPL controller when said IPL request notification is received in said IPL request notification receiving means, IPL apparatus notification receiving means for receiving said IPL apparatus notification from said IPL apparatus notifying means and for outputting a notice message, and program data receiving means for receiving said notice message from said IPL apparatus notification receiving means, and for receiving the program data which is transferred from said one of said peripheral apparatuses which is notified by the IPL apparatus notification responsive to said notice message; and said one of said peripheral apparatuses comprising:

IPL ready notification receiving means for receiving said IPL ready notification from said IPL ready state notifying means, and for outputting a ready notice, program transfer ready state determining means for receiving said ready notice from said IPL ready notification receiving means for determining whether the one of said peripheral apparatuses holds the program data to be transferred to the central processing unit, and is ready to transfer the program data to the central processing unit, when said IPL ready notification is received and for outputting a request indicator, program transfer ready state notifying means for receiving said request indicator from said program transfer ready state determining means, for sending to the IPL apparatus determining means in said IPL controller the transfer ready notification which notifies the IPL controller that the one of the peripheral apparatuses holds the program data to be transferred to the central processing unit, and is ready to transfer the program data to the central processing unit, when determined in said program transfer ready state determining means, and for outputting a transfer notice, and program data transfer means for receiving said transfer notice from said program transfer ready state notifying means, and for transferring the program data to the memory unit of the central processing unit after said transfer ready notification is sent by the program transfer ready state notifying means responsive to said transfer notice.

25. An initial program loading program according to claim 24, wherein said central processing unit further comprises transfer request sending means for receiving said notice message from said IPL apparatus notification receiving means instead of said program data receiving means, and for sending a transfer request for transferring the program data to said central processing unit from said one of the peripheral apparatuses which is notified by said IPL apparatus notification when the IPL apparatus notification is received in said IPL apparatus notification receiving means, and said program data receiving means receives the program data which is transferred from said one of said peripheral apparatuses to which said transfer request has been sent responsive to said notice message;

said one of said peripheral apparatuses further comprises transfer request receiving means for receiving said transfer request from said transfer request sending means; and said program data transfer means transfers the program data to the central processing unit when said transfer request is received.

26. An initial program loading system according to claim 24, wherein said IPL apparatus determining means determines whether the program data to be transferred to said central processing unit is from said one of said peripheral apparatuses when said IPL apparatus determining means receives said transfer ready notification first from said one of said peripheral apparatus.

27. An initial program loading system according to claim 26, wherein each of said peripheral apparatuses further comprises response delay means for delaying sending of the transfer ready notification by said program transfer ready state determining means for a predetermined time by sending said program transfer ready state determining means a delay notification, where the predetermined time in the peripheral apparatuses is preset according to predetermined priority orders of the peripheral apparatuses regarding supplying of the program data to the central processing unit.

28. An initial program loading system according to claim 24, wherein said IPL controller further comprises IPL cause information receiving means for receiving a cause of the IPL request when the IPL request is received in said IPL request receiving means and for outputting the cause, and said IPL apparatus determining means receives the cause from said IPL cause information receiving means and determines whether said program data to be transferred to the central processing unit is from said one of said peripheral apparatuses, based on the cause.

29. An initial program loading system according to claim 28, wherein said IPL controller further comprises IPL priority memorizing means for memorizing priority orders of the peripheral apparatuses for a plurality causes of IPL requests and for outputting said priority orders, and said IPL apparatus determining means receives said priority orders from said IPL priority memorizing means and determines whether said program data to be transferred to the central processing unit is from said one of said peripheral apparatuses which sent said transfer ready notification, based on the cause and the priority orders memorized in the IPL priority memorizing means.

* * * * *

UNITED STATES PATENT AND TRADEMARK OFFICE
CERTIFICATE OF CORRECTION

PATENT NO. : 5,305,457
DATED : April 19, 1994
INVENTOR(S) : Takida et al.

It is certified that error appears in the above-indentified patent and that said Letters Patent is hereby corrected as shown below:

Col. 1,   line 7, "field" should be --filed--.
Col. 17,  line 36, "he" should be --the--.
Col. 20,  line 8, "processor the" should be --processor. The--.
Col. 21,  line 24, "oft he" should be --of the--.
Col. 29,  line 37, "requests" should be --request--.
Col. 30,  line 31, "aid" should be --said--;
          line 40, delete "is".
Col 31,   line 46, "aid" should be --said--;
          line 67, "t" should be --to--.

Signed and Sealed this

Thirtieth Day of August, 1994

Attest:

*Attesting Officer*

BRUCE LEHMAN
*Commissioner of Patents and Trademarks*